US009648626B2

(12) United States Patent
Uemura et al.

(10) Patent No.: US 9,648,626 B2
(45) Date of Patent: May 9, 2017

(54) COMMUNICATION SYSTEM, MOBILE STATION APPARATUS, AND BASE STATION APPARATUS

(75) Inventors: Katsunari Uemura, Osaka (JP); Shohei Yamada, Osaka (JP); Daiichiro Nakashima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/382,824

(22) PCT Filed: Jun. 30, 2010

(86) PCT No.: PCT/JP2010/061157
§ 371 (c)(1),
(2), (4) Date: Feb. 28, 2012

(87) PCT Pub. No.: WO2011/004748
PCT Pub. Date: Jan. 13, 2011

(65) Prior Publication Data
US 2012/0157101 A1 Jun. 21, 2012

(30) Foreign Application Priority Data

Jul. 8, 2009 (JP) ................................. 2009-162147

(51) Int. Cl.
*H04W 36/20* (2009.01)
*H04W 36/30* (2009.01)
(Continued)

(52) U.S. Cl.
CPC ............. *H04W 72/08* (2013.01); *H04L 5/001* (2013.01); *H04L 5/0085* (2013.01); *H04L 25/0224* (2013.01); *H04L 2025/03802* (2013.01)

(58) Field of Classification Search
CPC ...... H04L 5/001; H04L 5/0085; H04W 72/08; H04W 36/0005
(Continued)

(56) References Cited

U.S. PATENT DOCUMENTS 8,385,920 B2    2/2013  Iwamura
8,451,798 B2 *  5/2013  Chen ............................. 370/331
(Continued)

FOREIGN PATENT DOCUMENTS

EP    2 117 135 A1    11/2009
JP    2009-49486 A     3/2009
(Continued)

OTHER PUBLICATIONS

3GPP Technical Specification Group Radio Access Network, Radio Resource Control (RRC), Protocol Specification; (Release 8), V8.7.0 (Jun. 2009).
(Continued)

*Primary Examiner* — Khawar Iqbal
(74) *Attorney, Agent, or Firm* — Birch, Stewart, Kolasch & Birch, LLP

(57) ABSTRACT

In a communication system in which a mobile station apparatus is connected to a base station apparatus simultaneously using a plurality of frequency bands, an event is efficiently determined concerning measurement of reception qualities of the frequency bands. The mobile station apparatus includes: a reception unit that receives from the base station apparatus an event condition for measuring a reception quality of at least one carrier component defined in the frequency bands different from each other and a parameter used for determining whether or not the event condition is satisfied; a measurement processing unit that measures the reception quality of the at least one carrier component; a cell determination unit that determines whether to adjust the
(Continued)

received parameter; and an event determination unit that sets the event condition based on the received parameter or the adjusted parameter and that determines whether or not the set event condition is satisfied.

5 Claims, 14 Drawing Sheets

(51) Int. Cl.
*H04W 72/08* (2009.01)
*H04L 5/00* (2006.01)
*H04L 25/02* (2006.01)
*H04L 25/03* (2006.01)

(58) Field of Classification Search
USPC ........ 455/436, 444; 370/252, 328, 331, 329, 370/430
See application file for complete search history.

(56) References Cited

U.S. PATENT DOCUMENTS

| | | | | |
|---|---|---|---|---|
| 8,509,796 | B2* | 8/2013 | Lee et al. | 455/452.1 |
| 8,995,376 | B2* | 3/2015 | Pan | H04L 5/001 370/329 |
| 9,185,728 | B2* | 11/2015 | Moon | H04W 74/006 |
| 9,204,349 | B2* | 12/2015 | Nagaraja | H04W 36/0055 |
| 9,247,532 | B2* | 1/2016 | Kim | H04L 5/001 |
| 2009/0037451 | A1* | 2/2009 | Borrill | 707/101 |
| 2009/0270104 | A1* | 10/2009 | Du et al. | 455/436 |
| 2009/0316659 | A1* | 12/2009 | Lindoff | H04J 11/0069 370/332 |
| 2009/0323638 | A1* | 12/2009 | Catovic et al. | 370/331 |
| 2010/0105377 | A1 | 4/2010 | Iwamura et al. | |
| 2010/0124918 | A1* | 5/2010 | Agashe et al. | 455/423 |
| 2010/0285806 | A1 | 11/2010 | Iwamura | |
| 2010/0298001 | A1* | 11/2010 | Dimou et al. | 455/441 |
| 2011/0021154 | A1* | 1/2011 | Marinier | H04W 72/02 455/67.11 |
| 2011/0080825 | A1* | 4/2011 | Dimou et al. | 370/216 |
| 2011/0096687 | A1* | 4/2011 | Dottling et al. | 370/252 |
| 2011/0117954 | A1 | 5/2011 | Iwamura et al. | |
| 2011/0134882 | A1* | 6/2011 | Aoyama et al. | 370/331 |
| 2011/0263282 | A1* | 10/2011 | Rune et al. | 455/507 |
| 2011/0286429 | A1* | 11/2011 | Vikberg et al. | 370/331 |
| 2011/0286433 | A1* | 11/2011 | Xiao | H04L 5/0007 370/331 |
| 2012/0039302 | A1* | 2/2012 | Chun | H04W 36/0027 370/331 |
| 2012/0069728 | A1* | 3/2012 | Jung | H04W 76/027 370/216 |
| 2012/0076041 | A1* | 3/2012 | Jung | H04W 24/10 370/252 |
| 2012/0076042 | A1* | 3/2012 | Chun | H04W 72/042 370/252 |
| 2012/0140684 | A1* | 6/2012 | Reddy et al. | 370/281 |
| 2012/0147855 | A1* | 6/2012 | Pani | H04W 36/30 370/331 |
| 2013/0143571 | A1 | 6/2013 | Iwamura et al. | |
| 2013/0201856 | A1* | 8/2013 | Chaponniere et al. | 370/252 |
| 2013/0331104 | A1* | 12/2013 | Iwamura et al. | 455/437 |
| 2013/0343342 | A1* | 12/2013 | Yu | H04W 36/165 370/331 |
| 2014/0018073 | A1* | 1/2014 | Frenger et al. | 455/434 |
| 2014/0105197 | A1* | 4/2014 | Chhabra | H04W 48/20 370/338 |
| 2015/0208398 | A1* | 7/2015 | Pan | H04L 5/001 370/329 |
| 2015/0304076 | A1* | 10/2015 | Lee | H04L 5/005 370/329 |

FOREIGN PATENT DOCUMENTS

JP 2009-147910 A 7/2009
WO WO 2008/08466 A1 7/2008

OTHER PUBLICATIONS

3GPP Technical Specification Group Radio Access Network; TR36. 814, Further Advancements for E-UTRA, Physical Layer Aspects. (Release 9), V1.0.0; http://www.3gpp.org/ftp/Specs/html-info/36814.htm.

3GPP Technical Specification TS36.300, V9.0.0, (Jun. 2009) Group Radio Access Network; Evolved Universal Terrestrial Radio Access (E-UTRA) and Evolved Universal Terrestrial Radio Access Network (E-UTRAN); Overall description; Stage 2 (Release 9) http://www.3gpp.org/ftp/Specs/html-info/36300.htm.

Huawei, "Measurement Report Triggering Asynchronization in CA" 3GPP TSG RAN WG2 Meeting #66, R2-093108, May 4-8, 2009.

PCT/ISA/210—International Search Report dated Sep. 21, 2010 for PCT/JP2010/061157.

Catt, "Handover for Carrier Aggregation", 3GPP TSG RAN WG2 Meeting #66bis, R2-093722, Los Angeles, USA, Jun. 29-Jul. 3, 2009, pp. 1-3.

Ericsson, ST-Ericsson, "Carrier Aggregation and mobility", 3GPP TSG-RAN WG2 #66bis, Tdoc R2-093815, Los Angeles, USA, Jun. 26-Jul. 3, 2009, pp. 1-3.

Huawei, "Carrier aggregation in Advanced E-UTRA", 3GPP TSG RAN WG1#53bis, R1-082448, Warsaw, Poland, Jun. 30-Jul. 4, 2008, pp. 1-4.

Qualcomm Europe, "Measurement considerations for multicarrier operation," 3GPP TSG-RAN WG2 meeting #66bis, R2-093713, Los Angeles, USA, Jun. 29-Jul. 3, 2009 (available Jun. 23, 2009), 3 pages.

Zte, "Measurement configuration in CA," 3GPP TSG-RAN WG2 Meeting #66bis, R2-093885, Los Angeles, USA, Jun. 29-Jul. 3, 2009 (available Jun. 23, 2009), 3 pages.

3RD Generation Partnership Project, "Technical Specification Group Radio Access Network; Evolved Universal Terrestrial Radio Access (E-UTRA), Radio Resource Control (RRC); Protocol Specification (Release 8)," 3GPP TS 36.331, V8.6.0, Jun. 2009, pp. 57-72 (17 pages total).

Office Action in U.S. Appl. No. 14/686,623 mailed Mar. 23, 2016.
US Advisory Action, dated Nov. 16, 2016, for U.S. Appl. No. 14/686,623.
U.S. Office Action dated Jul. 28, 2016, for U.S. Appl. No. 14/686,623.

* cited by examiner

FIG.10

| | EVENT NON-DETERMINATION CELL |
|---|---|
| EVENT1 | CELL ID1, CELL ID2 |
| EVENT2 | CELL ID1 TO CELL ID4 |
| ... | ... |
| EVENTn | CELL IDn |

COMMUNICATION SYSTEM, MOBILE STATION APPARATUS, AND BASE STATION APPARATUS

TECHNICAL FIELD

The present invention relates to a communication system in which a mobile station apparatus is connected to a base station apparatus simultaneously using a plurality of frequency bands and, in particular, to a method for determining an event concerning measurement of reception qualities of the frequency bands of the mobile station apparatus and the base station apparatus.

BACKGROUND ART

In 3GPP (3rd Generation Partnership Project), which is one of standard establishment projects of a communication network, there have been examined Evolved Universal Terrestrial Radio Access (hereinafter referred to as EUTRA), which is an evolved third generation mobile communication system, and Advanced EUTRA (also called LTE-Advanced), which is further evolved EUTRA.

In Advanced EUTRA, Carrier Aggregation has been proposed as a technology with which higher-speed data transmission can be achieved while maintaining compatibility with EUTRA (Chapter 5 in Non-Patent Document 1). Carrier aggregation is a technology with which a transmission apparatus transmits data to a reception apparatus using a plurality of different frequency bands (also called component carriers, carrier components, or element carriers), and with which broadband communication is achieved by virtually considering a plurality of different frequency bands as one frequency band.

A mobile station apparatus in a connected state (Connected Mode) in a communication system needs to perform a handover procedure in order to measure a reception quality of a signal transmitted from a base station apparatus and to sequentially switch communication to a base station apparatus with better quality than the currently connected base station apparatus. Therefore, a mobile station apparatus of Advanced EUTRA (hereinafter simply referred to as a mobile station apparatus) needs to measure reception qualities of a plurality of component carriers and to compare the reception qualities, respectively for handover. Handover is started by an instruction of the base station apparatus to which satisfaction of an event condition has been reported when the base station apparatus previously informs the mobile station apparatus of a predetermined event condition (Measurement Reporting Event (event trigger condition or measurement report condition)) and a parameter (Event Triggered Reporting Criteria (event trigger criteria)) used for the event condition, and the mobile station apparatus determines whether or not the informed event condition is satisfied (event determination) and determines that the event condition is satisfied as a result of the event determination (for example, Section 10. 1. 2 in Non-Patent Document 2). It has been examined that event determination is performed for each carrier component as described in Non-Patent Document 3.

CITATION LIST

Non-Patent Document

Non-Patent Document 1: 3GPP TR36.814, Further Advancements for E-UTRA, Physical Layer Aspects. V1.0.0;

Patent Document 2: 3GPP TS36.300, V9.0.0 (2009-06), Overall description; Stage2

Non Patent Document 3: R2-093108, Huawei, 3GPP TSG-RAN WG2#66, May 4-8, 2009, San Francisco, USA

DISCLOSURE OF THE INVENTION

Problem to be Solved by the Invention

When a mobile station apparatus measures a plurality of frequency bands with a conventionally known communication system, an object of the measurement is considered to perform different frequency measurement for inter-frequency handover. However, in a case of Advanced EUTRA with which a base station apparatus and the mobile station apparatus can be connected to each other using the plurality of frequency bands, even though the mobile station apparatus measures a plurality of frequencies, the measurement is not necessarily the measurement for the inter-frequency handover. Particularly, measurement by which the mobile station apparatus compares reception qualities between the plurality of frequency bands used for connection to the base station apparatus of Advanced EUTRA (hereinafter simply referred to as the base station apparatus) is unrelated to the inter-frequency handover, and in that case, the mobile station apparatus should not perform event determination concerning handover. As described above, it is necessary to consider a new event determination method different from a conventional method in the communication system in which the mobile station apparatus is connected to the base station apparatus by Carrier Aggregation using the plurality of frequency bands.

The present invention is made in view of the above-described problem, and an object of the present invention is to provide a communication system, a mobile station apparatus, and a base station apparatus that can efficiently determine an event concerning measurement of reception qualities in frequency bands in the communication system in which the mobile station apparatus is connected to the base station apparatus simultaneously using the plurality of frequency bands different from each other.

Means for Solving the Problem (1) In order to achieve the above-described object, the present invention takes the following measures. Namely, a communication system of the present invention is the one in which a base station apparatus and a mobile station apparatus communicate with each other simultaneously using a plurality of carrier components defined in frequency bands different from each other, and the communication system is characterized in that the base station apparatus comprises a transmission unit that informs the mobile station apparatus of an event condition for measuring a reception quality of the at least one carrier component and a parameter used for determining whether or not the event condition is satisfied, and that the mobile station apparatus comprises: a reception unit that receives the event condition and the parameter; a measurement processing unit that measures the reception quality of the at least one carrier component; a cell determination unit that determines whether or not to adjust the received parameter; and an event determination unit that sets the event condition based on the received parameter or the adjusted parameter and that determines whether or not the set event condition is satisfied.

As described above, since the mobile station apparatus determines whether or not to adjust the received parameter, sets the event condition based on the received parameter or the adjusted parameter, and determines whether or not the set event condition is satisfied, the mobile station apparatus can set the event condition for each measured carrier component to perform event determination, thus enabling to perform efficient event determination. When the mobile station apparatus performs parameter adjustment, satisfaction of the event condition is suppressed more than usual. As described above, since an unnecessary event condition is not satisfied and report of event information is suppressed from occurring, power consumption in the mobile station apparatus can be reduced. In addition, since a probability of communication disconnection and a probability of handover failure associated with unnecessary handover processing are reduced, a communication quality in the mobile station apparatus improves. In addition, since a radio resource for reporting the event information is suppressed from being consumed, a utilization efficiency of the radio resource improves. The base station apparatus does not need complex control since handover is controlled based on a measurement report from the mobile station apparatus, thus resulting in reduced complexity of scheduling.

(2) In addition, in the communication system of the present invention, the cell determination unit is characterized by determining to adjust the received parameter when the plurality of carrier components whose reception qualities are measured in the measurement processing unit is used for connection to the base station apparatus.

As described above, since the received parameter is adjusted when the plurality of carrier components whose reception qualities are measured is used for connection to the base station apparatus, satisfaction of the event condition is suppressed in the carrier components.

(3) In addition, in the communication system of the present invention, the cell determination unit is characterized by determining to adjust the received parameter when the plurality of carrier components whose reception qualities are measured in the measurement processing unit is not reference cells used as criteria of measurement of the reception qualities in the measurement processing unit.

As described above, since the received parameter is adjusted when the plurality of carrier components whose reception qualities are measured is not the reference cells used as the criteria of measurement of the reception qualities in the measurement processing unit, it becomes possible to simplify a measurement method by using the reference cell, thus enabling to reduce complexity of controlling the mobile station apparatus or the base station apparatus. Further, satisfaction of the event condition is suppressed in the carrier components.

(4) In addition, in the communication system of the present invention, the event determination unit is characterized by adjusting the received parameter so that a time required until the event condition is satisfied may be longer than that before adjusting the received parameter with respect to the carrier component on which the cell determination unit has determined to adjust the received parameter, and determining whether or not the set event condition is satisfied.

As described above, since the event determination unit adjusts the received parameter so that the time required until the event condition is satisfied may be longer than that before adjusting the received parameter and determines whether or not the set event condition is satisfied, satisfaction of the event condition is suppressed in the carrier components.

(5) In addition, in the communication system of the present invention, the event determination unit is characterized by disabling a scaling factor used for adjusting the time required until the event condition is satisfied with respect to the carrier component on which the cell determination unit has determined to adjust the received parameter, and determining whether or not the set event condition is satisfied when the mobile station apparatus is moving at high speed.

As described above, since the event determination unit disables the scaling factor used for adjusting the time required until the event condition is satisfied with respect to the carrier component on which the cell determination unit has determined to adjust the received parameter and determines whether or not the set event condition is satisfied, satisfaction of the event condition is suppressed in the carrier components.

(6) In addition, in the communication system of the present invention, the event determination unit is characterized by adjusting the received parameter so that satisfaction of the event condition may be suppressed in the carrier component on which the cell determination unit has determined to adjust the received parameter.

As described above, since the event determination unit adjusts the received parameter so that satisfaction of the event condition may be suppressed in the carrier component on which the cell determination unit has determined to adjust the received parameter, the unnecessary event condition is not satisfied, and report of the event information is suppressed from occurring, thus enabling to reduce power consumption in the mobile station apparatus.

(7) In addition, a communication system of the present invention is the one in which a base station apparatus and a mobile station apparatus communicate with each other simultaneously using a plurality of carrier components defined in frequency bands different from each other, and the communication system is characterized in that the base station apparatus comprises a transmission unit that informs the mobile station apparatus of an event condition for measuring a reception quality of the at least one carrier component and a parameter used for determining whether or not the event condition is satisfied, and that the mobile station apparatus comprises: a reception unit that receives the event condition and the parameter; a measurement processing unit that measures the reception quality of the at least one carrier component; a cell determination unit that determines whether the event condition is satisfied; and an event determination unit that sets the event condition based on a determination result by the cell determination unit and that determines whether or not the set event condition is satisfied.

As described above, since the mobile station apparatus determines whether or not to determine whether or not the event condition is satisfied, the mobile station apparatus sets the event condition for each measured carrier component to perform event determination, thus enabling to perform efficient event determination. When the mobile station apparatus does not perform event determination, satisfaction of the event condition is suppressed more than usual. As described above, since an unnecessary event condition is not satisfied and event report is suppressed from occurring, power consumption in the mobile station apparatus can be reduced. In addition, since a radio resource for reporting the event is suppressed from being consumed, a utilization efficiency of the radio resource improves. In addition, since the base station apparatus can specify whether or not event determination is performed for each cell with respect to the mobile station apparatus, flexible handover control can be performed based on actual arrangement of the base station apparatus.

(8) In addition, in the communication system of the present invention, the cell determination unit is characterized by determining not to determine whether or not the event condition is satisfied when the plurality of carrier components whose reception qualities are measured in the measurement processing unit is used for connection to the base station apparatus.

As described above, since determination is not performed on whether or not the event condition is satisfied when the plurality of carrier components whose reception qualities are measured is used for connection to the base station apparatus, satisfaction of the event condition is suppressed in the carrier components.

(9) In addition, in the communication system of the present invention, the cell determination unit is characterized by determining not to determine whether or not the event condition is satisfied when the plurality of carrier components whose reception qualities are measured in the measurement processing unit is not reference cells used as criteria of measurement of the reception qualities in the measurement processing unit.

As described above, since determination is not performed on whether or not the event condition is satisfied when the plurality of carrier components whose reception qualities are measured is not the reference cells used as the criteria of measurement of the reception qualities in the measurement processing unit, satisfaction of the event condition is suppressed in the carrier components.

(10) A mobile station apparatus of the present invention is the one applied to a communication system in which a base station apparatus and the mobile station apparatus communicate with each other simultaneously using a plurality of carrier components defined in frequency bands different from each other, and the mobile station apparatus is characterized by comprising: a reception unit that receives from the base station apparatus an event condition for measuring a reception quality of the at least one carrier component and a parameter used for determining whether or not the event condition is satisfied; a measurement processing unit that measures the reception quality of the at least one carrier component; a cell determination unit that determines whether or not to adjust the received parameter; an event determination unit that sets the event condition based on the received parameter or the adjusted parameter and that determines whether or not the set event condition is satisfied.

As described above, since the mobile station apparatus determines whether or not to adjust the received parameter, sets the event condition based on the received parameter or the adjusted parameter, and determines whether or not the set event condition is satisfied, the mobile station apparatus sets the event condition for each measured carrier component to perform event determination, thus enabling to perform efficient event determination. When the mobile station apparatus does not perform event determination, satisfaction of the event condition is suppressed more than usual. As described above, since the unnecessary event condition is not satisfied and event report is suppressed from occurring, power consumption in the mobile station apparatus can be reduced. In addition, since a probability of communication disconnection and a probability of handover failure associated with unnecessary handover processing are reduced, a communication quality in the mobile station apparatus improves. In addition, since a radio resource for reporting the event is suppressed from being consumed, a utilization efficiency of the radio resource improves. In addition, since the base station apparatus can specify whether or not event determination is performed for each cell with respect to the mobile station apparatus, flexible handover control can be performed based on actual arrangement of the base station apparatus.

(11) In addition, in the mobile station apparatus of the present invention, the cell determination unit is characterized by determining to adjust the received parameter when the plurality of carrier components whose reception qualities are measured in the measurement processing unit is used for connection to the base station apparatus.

As described above, since the received parameter is adjusted when the plurality of carrier components whose reception qualities are measured is used for connection to the base station apparatus, satisfaction of the event condition is suppressed in the carrier components.

(12) In addition, in the mobile station apparatus of the present invention, the cell determination unit is characterized by determining to adjust the received parameter when the plurality of carrier components whose reception qualities are measured in the measurement processing unit is not reference cells used as criteria of measurement of the reception qualities in the measurement processing unit.

As described above, since the received parameter is adjusted when the plurality of carrier components whose reception qualities are measured is not the reference cells used as the criteria of measurement of the reception qualities, satisfaction of the event condition is suppressed in the carrier components.

(13) In addition, in the mobile station apparatus of the present invention, the event determination unit is characterized by adjusting the received parameter so that a time required until the event condition is satisfied may be longer than that before adjusting the received parameter with respect to the carrier component on which the cell determination unit has determined to adjust the received parameter, and determining whether or not the set event condition is satisfied.

As described above, since the event determination unit adjusts the received parameter so that the time required until the event condition is satisfied may be longer than that before adjusting the received parameter with respect to the carrier component on which the cell determination unit has determined to adjust the received parameter, satisfaction of the event condition is suppressed in the carrier components.

(14) In addition, in the mobile station apparatus of the present invention, the event determination unit is characterized by disabling a scaling factor used for adjusting the time required until the event condition is satisfied with respect to the carrier component on which the cell determination unit has determined to adjust the received parameter, and determining whether or not the set event condition is satisfied when the mobile station apparatus is moving at high speed.

As described above, since the event determination unit disables the scaling factor used for adjusting the time required until the event condition is satisfied with respect to the carrier component on which the cell determination unit has determined to adjust the received parameter and determines whether or not the set event condition is satisfied, satisfaction of the event condition is suppressed in the carrier components.

(15) In addition, in the mobile station apparatus of the present invention, the event determination unit is characterized by adjusting the received parameter so that satisfaction of the event condition may be suppressed in the carrier component on which the cell determination unit has determined to adjust the received parameter.

As described above, since the event determination unit adjusts the received parameter so that satisfaction of the event condition may be suppressed in the carrier component on which the cell determination unit has determined to adjust the received parameter, the unnecessary event condition is not satisfied and report of the event information is suppressed from occurring, thus enabling to reduce power consumption in the mobile station apparatus.

(16) In addition, a mobile station apparatus of the present invention is the one applied to a communication system in which a base station apparatus and the mobile station apparatus communicate with each other simultaneously using a plurality of carrier components defined in frequency bands different from each other, and the mobile station apparatus is characterized by comprising: a reception unit that receives from the base station apparatus an event condition for measuring a reception quality of the at least one carrier component and a parameter used for determining whether or not the event condition is satisfied; a measurement processing unit that measures the reception quality of the at least one carrier component; a cell determination unit that determines whether or not to determine whether the event condition is satisfied; and an event determination unit that sets the event condition based on a determination result by the cell determination unit and that determines whether or not the set event condition is satisfied.

As described above, since the mobile station apparatus determines whether or not to determine whether or not the event condition is satisfied, the mobile station apparatus sets the event condition for each measured carrier component to perform event determination, thus enabling to perform efficient event determination. When the mobile station apparatus does not perform event determination, satisfaction of the event condition is suppressed more than usual. As described above, since an unnecessary event condition is not satisfied and event report is suppressed from occurring, power consumption in the mobile station apparatus can be reduced. In addition, since a probability of communication disconnection and a probability of handover failure associated with unnecessary handover processing are reduced, a communication quality in the mobile station apparatus improves. In addition, since a radio resource for reporting the event is suppressed from being consumed, a utilization efficiency of the radio resource improves. In addition, since the base station apparatus can specify whether or not event determination is performed for each cell with respect to the mobile station apparatus, flexible handover control can be performed based on actual arrangement of the base station apparatus.

(17) In addition, in the mobile station apparatus of the present invention, the cell determination unit is characterized by determining not to determine whether or not the event condition is satisfied when the plurality of carrier components whose reception qualities are measured in the measurement processing unit is used for connection to the base station apparatus.

As described above, when the plurality of carrier components whose reception qualities are measured is used for connection to the base station apparatus, determination is not performed on whether or not the event condition is satisfied, and thus satisfaction of the event condition is suppressed in the carrier components.

(18) In addition, in the mobile station apparatus of the present invention, the cell determination unit is characterized by determining not to determine whether or not the event condition is satisfied when the plurality of carrier components whose reception qualities are measured in the measurement processing unit is not reference cells used as criteria of measurement of the reception qualities in the measurement processing unit.

As described above, since determination is not performed on whether or not the event condition is satisfied when the plurality of carrier components whose reception qualities are measured is not the reference cells used as the criteria of measurement of the reception qualities in the measurement processing unit, satisfaction of the event condition is suppressed in the carrier components.

(19) A base station apparatus of the present invention is the one applied to a communication system in which the base station apparatus and a mobile station apparatus communicate with each other simultaneously using a plurality of carrier components defined in frequency bands different from each other, and the base station apparatus is characterized by comprising a transmission unit that informs the mobile station apparatus of an event condition for the mobile station apparatus to measure a reception quality of the at least one carrier component and a parameter used for determining whether or not the event condition is satisfied.

As described above, since the transmission unit informs the mobile station apparatus of the event condition as a precondition to implement an event that changes a communication state of the mobile station apparatus and the parameter used for determining whether or not the event condition is satisfied, the mobile station apparatus sets the event condition for each measured carrier component to perform event determination, thus enabling to perform efficient event determination. When the mobile station apparatus does not perform event determination, satisfaction of the event condition is suppressed more than usual. As described above, since an unnecessary event condition is not satisfied and event report is suppressed from occurring, power consumption in the mobile station apparatus can be reduced. In addition, since a radio resource for reporting the event is suppressed from being consumed, a utilization efficiency of the radio resource improves. In addition, since the base station apparatus can specify whether or not event determination is performed for each cell with respect to the mobile station apparatus, flexible handover control can be performed based on actual arrangement of the base station apparatus.

(20) In addition, in the base station apparatus of the present invention, the mobile station apparatus further comprises an event condition setting unit that sets for each mobile station apparatus event determination information that specifies whether or not the mobile station apparatus determines whether or not said event condition is satisfied, and the transmission unit is characterized by transmitting the event determination information to the mobile station apparatus.

As described above, since event condition setting unit sets for each mobile station apparatus the event determination information that specifies whether or not the mobile station apparatus determines whether or not the event condition is satisfied, satisfaction of the event condition is suppressed in the carrier components.

(21) In addition, in the base station apparatus of the present invention, the event determination information is set for the each event condition, and is characterized by including information that indicates one or more cell identifiers.

As described above, since the event determination information is set for each event condition and includes information that indicates one or more cell identifiers, the base station apparatus can specify whether or not event determination is performed for each cell with respect to the mobile station apparatus, thus enabling to perform flexible handover control based on actual arrangement of the base station apparatus.

Advantages of the Invention

According to the embodiments of the present invention, since the mobile station apparatus sets the event condition for each carrier component to perform event determination, efficient event determination can be performed. In addition, since the mobile station apparatus does not transmit unnecessary measurement report to the base station apparatus, power consumption can be reduced. In addition, since the probability of communication disconnection and the probability of handover failure associated with unnecessary handover processing are reduced in the mobile station apparatus, the communication quality improves. In addition, since the radio resource for reporting the event information is suppressed from being consumed, the utilization efficiency of the radio resource improves. Since the base station apparatus controls handover based on measurement report from the mobile station apparatus, complex control becomes unnecessary, thus resulting in the reduced complexity of scheduling.

BRIEF DESCRIPTION OF THE DRAWINGS

FIG. 10 is one example of a table referred to specify a cell for which a parameter adjustment process is implemented or not for each event condition when the base station apparatus 3 according to the third embodiment of the present invention informs the mobile station apparatus 1 of the event condition;

BEST MODES FOR CARRYING OUT THE INVENTION

Carrier Aggregation, a handover parameter, and a physical channel concerning the present invention will be simply described before describing embodiments of the present invention.

(1) Carrier Aggregation

Figure 11:
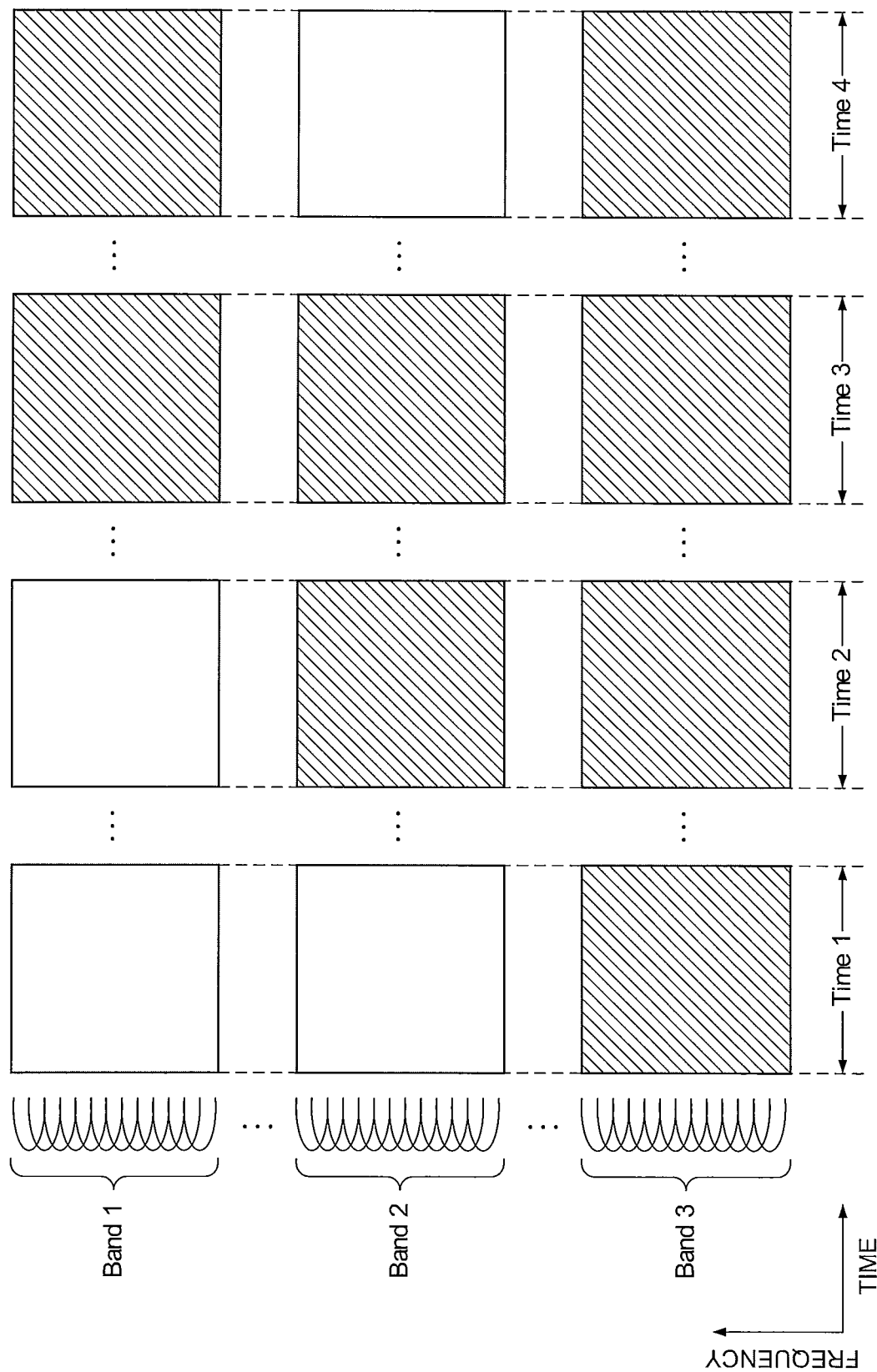
FIG. 11 is an illustration showing one example of increase and decrease of reception frequency bands using Carrier Aggregation.

FIG. 11 is an illustration showing one example of increase and decrease of reception frequency bands using Carrier Aggregation. Bands 1 to 3 show downlink frequency bands (component carriers) transmitted by a base station apparatus, respectively, and a plurality of frequency bands can be simultaneously used for connection to one mobile station apparatus by Carrier Aggregation. The Bands 1 to 3 are different frequencies, respectively. It is to be noted that transmission bandwidths of the frequency bands of the Bands 1 to 3 may respectively be the same as each other, or a part or all of the transmission bandwidths may be different from each other. In addition, the Bands 1 to 3 may be contiguous frequency bands, or may be discontiguous frequency bands. Each frequency band may be a frequency band available only for a mobile station apparatus of Advanced EUTRA, or may be a frequency band available for both the mobile station apparatus of Advanced EUTRA and a mobile station apparatus of EUTRA. A mobile station apparatus of the example can simultaneously receive up to three 20 MHz frequency bands, and a total of reception bandwidths is 60 MHz.

In an example shown in FIG. 11, at a certain time Time 1, the mobile station apparatus communicates with the base station apparatus using 20 MHz of the Band 3 and simultaneously measures the Bands 1 to 2. In addition, at another certain time Time 2, the Band 2 is added to the mobile station apparatus, which communicates with the base station apparatus using a total of 40 MHz of the Bands 2 and 3 and simultaneously measures the Band 1. In addition, at still another certain time Time 3, the Band 1 is further added to the mobile station apparatus, which communicates with the base station apparatus using a total of 60 MHz of the Bands 1 to 3. In addition, at yet still another certain time Time 4, the Band 2 is eliminated from the mobile station apparatus, which communicates with the base station apparatus using a total of 40 MHz of the Bands 1 and 3 and simultaneously measures the Band 2. As described above, it becomes possible to significantly improve a data rate without largely changing a configuration of the base station apparatus by using Carrier Aggregation. It is to be noted that time lengths of the Times 1 to 4 are variable, and there is no necessity that each time length is the same as each other.

When using a communication system in which GI (Guard Interval) called CP (Cyclic Prefix) for each symbol is provided as OFDMA (Orthogonal Frequency Division Multiplexing Access), OFDM symbol timing of each frequency band used for Carrier Aggregation is preferably equal to each other. Equal OFDM symbol timing means that a difference of reception timing of an OFDM symbol of each frequency band falls within a length of the CP at a reception antenna end of the mobile station apparatus. In addition, it is also possible to apply the above-mentioned Carrier Aggregation to uplink frequency bands transmitted by the mobile station apparatus. When Carrier Aggregation is applied to the uplink frequency bands, it is preferable that transmission timing of the uplink frequency bands is the same as each other or a difference of the transmission timing falls within the length of the CP.

(2) Handover Parameter

Handover parameters mean a semi-static plurality of parameter groups that the base station apparatus holds therein to make the mobile station apparatus determine timing of handover execution. Here, handover in EUTRA and a handover parameter will be described. Handover is started by reporting satisfaction of an event condition to the base station apparatus when the base station apparatus informs the mobile station apparatus of the event condition applied to a reception quality (Ms) of a currently connected cell (serving cell) and a reception quality (Mn) of the other cell (neighboring cell), and the event condition is satisfied. The reception qualities can be obtained when the mobile station apparatus measures RSRP (Reference Signal Received Power) or a RSRQ (Reference Signal Received Quality) of a downlink reference signal.

An event condition concerning handover (also referred to as a handover condition) typically means that an offset value (Oc) set for each cell and an offset value (Of) set for each frequency band are added to respective reception qualities of a serving cell and a neighboring cell, and that compared is a result obtained by further adding an offset value (Off) for an event to the reception quality of the serving cell, and the event condition is satisfied when the reception quality of the neighboring cell exceeds that of the serving cell. In addition, the base station apparatus informs the mobile station apparatus of hysteresis that adjusts the reception quality of the neighboring cell and a TTT (Time To Trigger), which is a time required until the handover condition is satisfied, so that the handover does not occur frequently. Namely, the handover parameter includes the offset value for each cell, the offset value for each frequency band, the offset value for the event, the hysteresis, and the TTT.

Figure 12:
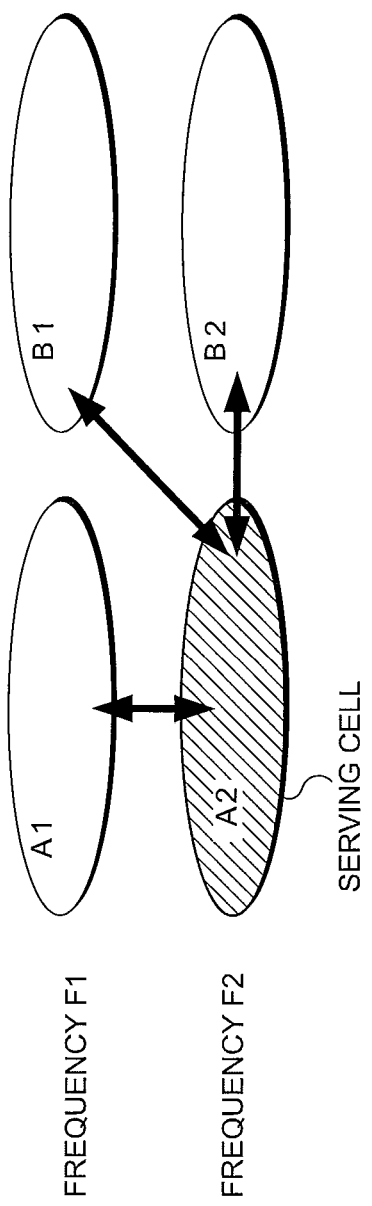
FIG. 12 is an illustration explaining cells to be measured and a measurement method.

FIG. 12 is an illustration explaining cells to be measured and a measurement method. A correspondence relation for each cell concerning event determination will be described using FIG. 12. Cells A1 and A2 of FIG. 12 are the cells arranged spatially in the same area and operated with a frequency F1 and a frequency F2 different from each other. Similarly, cells B1 and B2 are also the cells arranged spatially in the same area and operated with the frequencies F1 to F2 different from each other. At this time, when a serving cell is the cell A2, handover from the cell A2 to the cell A1 or to the cell B1 is the inter-frequency handover, and an offset value of the cell A2 (Oc_A2), an offset value of the frequency F2 (Of_F2), and the offset value for the event (Off) are added to the cell A2. In addition, an offset value of the cell A1 (Oc_A1), an offset value of the frequency F1 (Of_F1), and the hysteresis are added to the cell A1. In addition, an offset value of the cell B1 (Oc_B1), the offset value of the frequency F1 (Of_F1), and the hysteresis are added to the cell B1. In addition, handover from the cell A2 to the cell B2 is an intra-frequency handover, and the offset value of the cell A2 (Oc_A2) and the offset value for the event (Off) are added to the cell A2. In addition, an offset value of the cell B2 (Oc_B2) and the hysteresis are added to the cell B2. The hysteresis and the TTT that are used for the handover condition are set for each frequency band. Negative values may be set to the offset values and the hysteresis.

Further, it is also possible for the base station apparatus to specify a scaling factor for shortening (or extending) the TTT in order to reduce a time required until the handover condition is satisfied according to a moving speed of the mobile station apparatus. Namely, the scaling factor is used to shorten (or extend) the time required until the handover condition is satisfied. The base station apparatus can specify the scaling factor for each moving speed of the mobile station apparatus, and for example, the base station apparatus can also specify different scaling factors to the mobile station apparatus when the mobile station apparatus is moving at high speed and when it is moving at medium speed slower than the high speed. The base station apparatus can also assign a different scaling factor for each mobile station apparatus. When 0.5 is specified from the base station apparatus as the scaling factor at the time of high speed movement, and the mobile station apparatus is determined to be moving at high speed, the mobile station apparatus sets as the TTT a value obtained by multiplying 0.5 to the informed TTT, and then performs event determination. As described above, since the scaling factor and the moving speed (moving speed information) are also related to the handover condition, they are also included in the handover parameter. The moving speed information is generated in the mobile station apparatus according to the number of handovers having occurred within a predetermined time in the mobile station apparatus.

(3) Physical Channel

A physical channel (or a physical signal) used in EUTRA and Advanced EUTRA will be described. There is a possibility that the physical channel may be added or a structure thereof may be changed in the future in EUTRA and Advanced EUTRA, but even when the physical channel is changed, a description of each embodiment of the present invention is not influenced by the change.

A synchronization signal is used by the mobile station apparatus to detect at the base station quickly apparatus (or a relay station apparatus). The synchronization signal includes three types of primary synchronization signals and a secondary synchronization signal composed of thirty-one types of codes arranged alternately in a frequency domain, and 504 kinds of cell identifiers (cell IDs) that identify the base station apparatus and frame timing for radio synchronization are indicated according to a combination of the primary synchronization signal and the secondary synchronization signal. The mobile station apparatus specifies a cell ID received by cell searching.

PBCH (Physical Broadcast Channel) is transmitted in order to inform of a control parameter (broadcast information) used in common in the mobile station apparatuses in the cell. The broadcast information that is not informed by the physical broadcast channel is transmitted using a physical downlink shared channel, while a radio resource is informed of by a physical downlink common channel. As the broadcast information, access restriction information, a cell global ID that indicates an identifier for an individual cell, or the like is informed of.

The downlink reference signal is a pilot signal transmitted for each cell with predetermined electric power. In addition, the downlink reference signal is the known signal periodically repeated at a frequency-time position based on a predetermined rule. The mobile station apparatus measures the reception quality for each cell by receiving the downlink reference signal. In addition, the mobile station apparatus uses the downlink reference signal as the physical downlink common channel transmitted simultaneously with the downlink reference signal or also as a reference signal for demodulating the physical downlink shared channel. A sequence that can be uniquely identified for each cell is used for a sequence used for the downlink reference signal. It is to be noted that although the downlink reference signal may be described as a cell-dedicated RS (Cell-specific reference signal), an application and a meaning thereof are the same as those of the downlink reference signal.

A PDCCH (Physical Downlink Common Channel) is transmitted with several OFDM symbols from a head of each subframe and is used in order to instruct to the mobile station apparatus radio resource allocation information in accordance with scheduling of the base station apparatus and an adjusted amount of increase and decrease of transmission power. The mobile station apparatus receives the downlink common control channel before transmitting and receiving the downlink data (downlink traffic data) and a control message, and needs to obtain uplink grant at the time of transmission and the radio resource allocation information from downlink grant at the time of reception.

The PDSCH (Physical Downlink Shared Channel) is also used to inform of paging information and a part of the broadcast information other than the downlink data. The radio resource allocation information of the physical downlink shared channel is indicated by the physical downlink common channel.

A PUSCH (Physical Uplink Shared Channel) mainly transmits uplink data (uplink traffic data), and can include control data, such as a downlink reception quality and ACK/NACK. In addition, radio resource allocation information of the physical uplink shared channel is indicated by the physical downlink common channel similarly to the downlink.

A PRACH (Physical Random Access Channel) is the channel used to inform of a preamble sequence and has a guard time. The physical random access channel is used as an access procedure to the base station apparatus from the mobile station apparatus in which uplink transmission timing is in an asynchronous state, and is used for a radio resource request or adjustment of uplink transmission timing. It is to be noted that detailed description of physical channels other than the above will be omitted since they are not related to each embodiment of the present invention.

[Example of Communication Network Configuration of the Present Invention]

Figure 13:
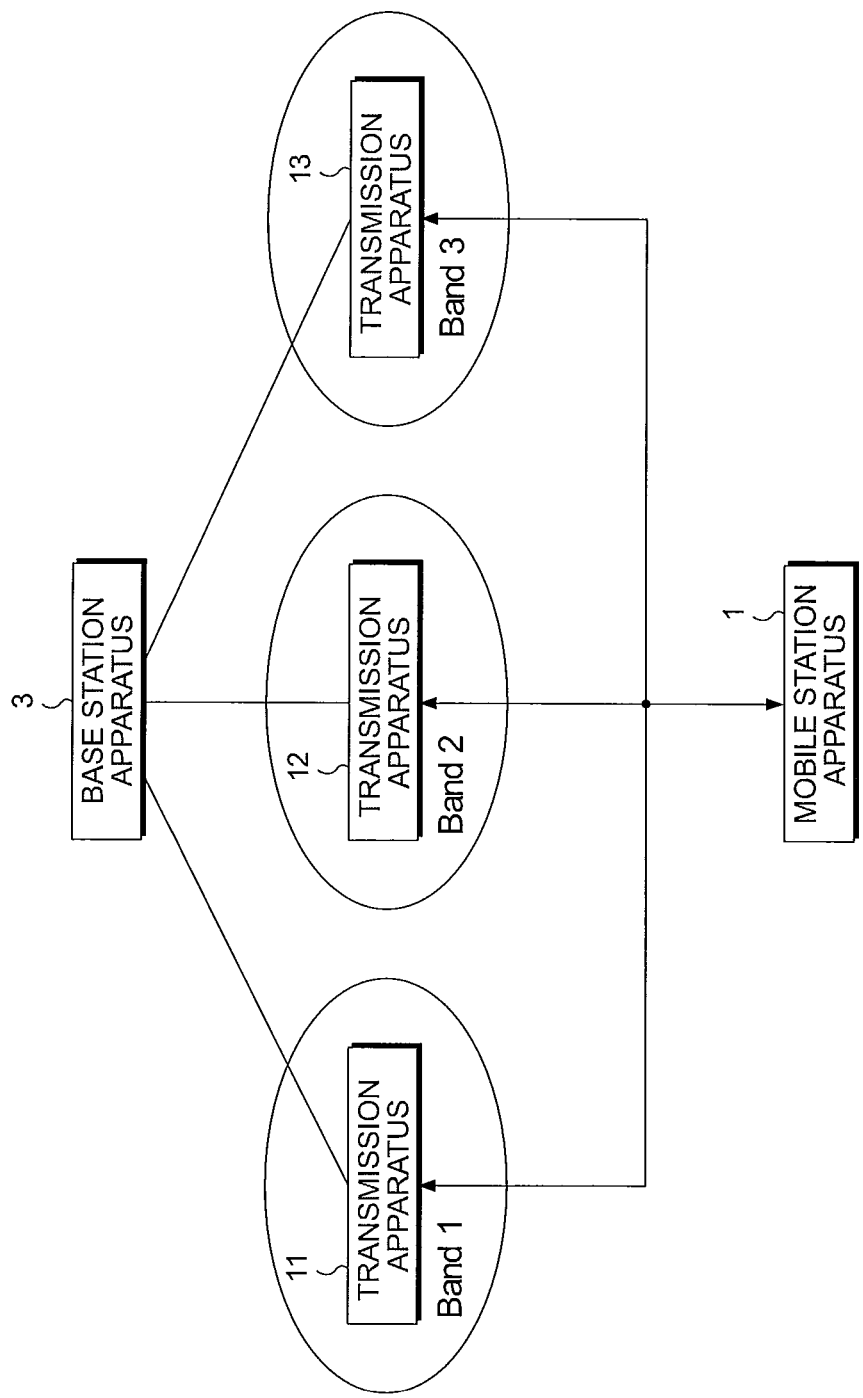
FIG. 13 is an illustration showing one example of a communication network configuration according to the embodiment of the present invention.

FIG. 13 is an illustration showing one example of a communication network configuration according to the embodiment of the present invention. When a mobile station apparatus 1 can be connected to a base station apparatus 3 by simultaneously using a plurality of frequency bands (component carriers, the Bands 1 to 3) by Carrier Aggregation, as a communication network configuration, such a configuration is preferred from a viewpoint of simplifying control that one certain base station apparatus 3 comprises transmission apparatuses 11 to 13 (reception apparatuses 21 to 23, which are not shown) for each plurality of frequency bands, and that each frequency band is controlled by the one base station apparatus 3. However, the communication network configuration may be the one in which the base station apparatus 3 performs transmission in the plurality of frequency bands using one transmission apparatus for reasons that the plurality of frequency bands is contiguous frequency bands, etc. Communicable ranges of the respective frequency bands controlled by the transmission apparatus of the base station apparatus 3 are considered as cells, and the cells exist spatially in the same area. At this time, areas (cells) covered by the respective frequency bands may be different in size, i.e., different in radius, respectively. However, it is to be noted that although each area of a frequency of a carrier component formed by the base station apparatus 3 will be described by referring to as the cell in a description below, the description may differ from a definition of the cell in an actually operated communication system. For example, in a certain communication system, a component carrier used by Carrier Aggregation may be defined as a simple additional radio resource instead of the cell. Even if a case occurs where a definition of the cell in the description below is different from a definition of the cell in the actually operated communication system by the component carrier being referred to as the cell in the present invention, a gist of the present invention is not influenced by the case.

[Example of Correspondence Relation of Component Carrier]

Figure 14:
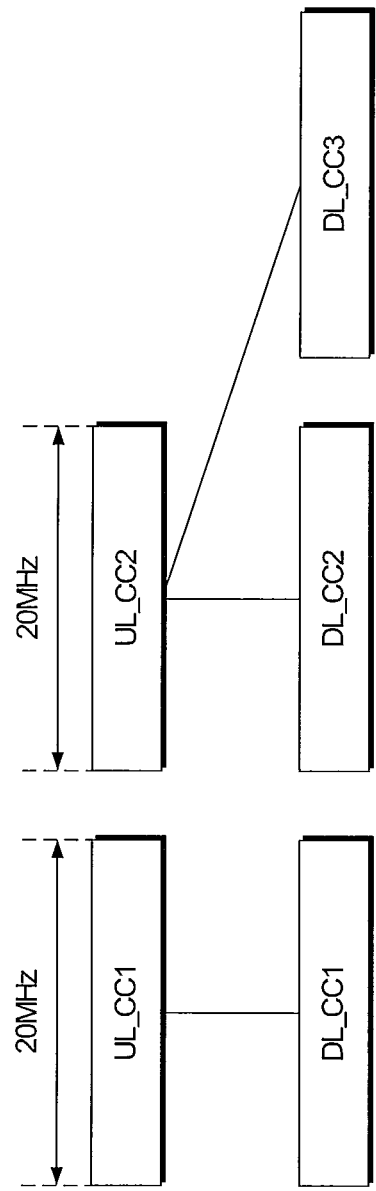
FIG. 14 is an illustration showing an example of correspondence relation of configured downlink component carrier and uplink component carrier when the mobile station apparatus 1 according to the embodiment of the present invention performs Carrier Aggregation.

FIG. 14 is an illustration showing an example of a correspondence relation of configured downlink component carrier and uplink component carrier when the mobile station apparatus 1 according to the embodiment of the present invention performs Carrier Aggregation. A downlink component carrier DL_CC1 corresponds to an uplink component carrier UL_CC1. Namely, ACK/NACK of data and a feedback of a reception quality that have been received by the DL_CC1 are transmitted by the UL_CC1. In addition, there may also be a case where a plurality of downlink component carriers corresponds to the uplink component carrier. In the example shown in FIG. 14, ACK/NACK of data and the feedback of the reception quality that have been received by the DL_CC2 and a DL_CC3 are both transmitted by an UL_CC2.

The mobile station apparatus 1 selects a cell using a usual cell search procedure without being particularly conscious from which base station apparatus 3 the downlink component carrier is transmitted or by which base station apparatus 3 the uplink component carrier is received. Subsequently, from broadcast information of the selected cell, the mobile station apparatus 1 obtains information, such as a frequency band and a bandwidth of the uplink component carrier to which the downlink component carrier corresponds. The base station apparatus 3 may individually set a correspondence relation of the downlink component carrier and the uplink component carrier for each mobile station apparatus 1. The mobile station apparatus 1 starts Carrier Aggregation based on an instruction of the base station apparatus 3, and starts transmission and reception with respect to a plurality of component carriers.

Hereinafter, preferred embodiments of the present invention will be described in detail based on accompanying drawings while considering the above points. It is to be noted that when it is determined in a description of the present invention that a concrete description of known functions and configurations related to the present invention makes a gist of the present invention unclear, detailed description of the known functions and configurations will be omitted.

Hereinafter, the embodiments of the present invention will be described with reference to the drawings.

First Embodiment

A first embodiment of the present invention will be described hereinafter. The embodiment relates to a method for adjusting a parameter of an event condition for the mobile station apparatus 1 to efficiently perform event determination when the mobile station apparatus 1 uses a plurality of downlink frequency bands (downlink component carriers) by Carrier Aggregation.

Figure 1:
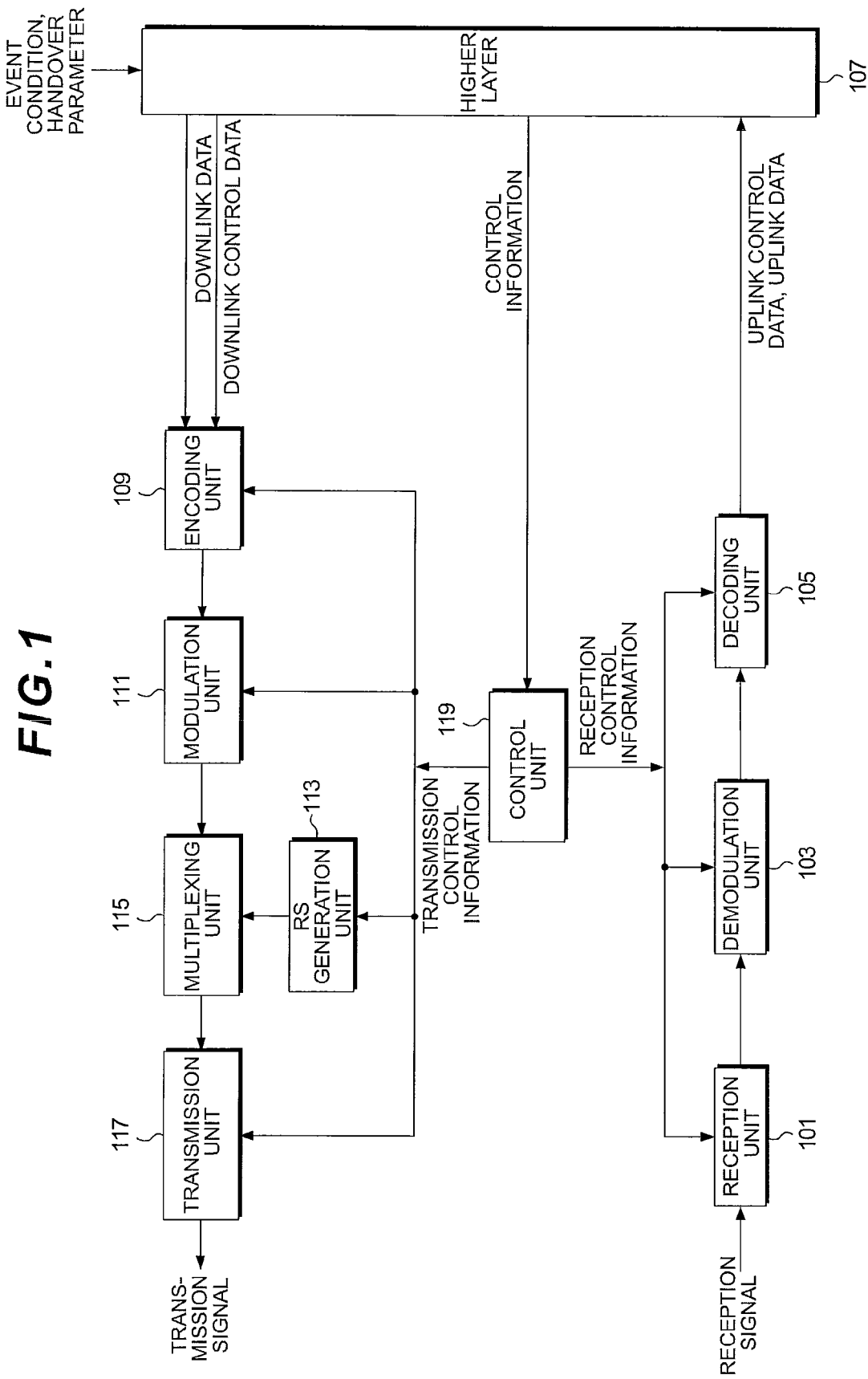
FIG. 1 is a block diagram showing a schematic configuration of a base station apparatus 3 according to an embodiment of the present invention.

FIG. 1 is a block diagram showing a schematic configuration of the base station apparatus 3 according to the embodiment of the present invention. This base station apparatus 3 includes: a reception unit 101; a demodulation unit 103; a decoding unit 105; an higher layer 107; an encoding unit 109; a modulation unit 111; an RS generation unit 113; a multiplexing unit 115; a transmission unit 117; and a control unit 119.

The higher layer 107 inputs downlink data and downlink control data into the encoding unit 109. The encoding unit 109 encodes the input data and inputs it into the modulation unit 111. The modulation unit 111 modulates the encoded signal. In addition, a signal output from the modulation unit 111 and a downlink reference signal generated by the RS generation unit 113 are mapped in a frequency domain by the multiplexing unit 115. An output signal from the multiplexing unit 115 is input into the transmission unit 117. The transmission unit 117 converts the signal of the frequency domain into a signal of a time domain, places the converted signal on a carrier with a given frequency to perform power amplification, and transmits the converted signal.

The higher layer 107 sets an event condition for each mobile station apparatus 1. The event condition and a handover parameter that have been output from the higher layer 107 are input into the encoding unit 109 and the modulation unit 111 as the downlink data when the event condition needs to be set, and are allocated appropriately in a physical broadcast channel or a physical downlink shared channel to be transmitted as transmission signals. The physical downlink shared channel in which the handover parameter transmitted by the base station apparatus 3 has been allocated typically configures a layer 3 message (RRC message).

In addition, the reception unit 101 converts the signal received from the mobile station apparatus 1 into a digital signal of a baseband. The digital signal is input into the demodulation unit 103 to be demodulated. The signal demodulated by the demodulation unit 103 is subsequently input into the decoding unit 105 to be decoded, and uplink control data and uplink data that have been properly decoded are output to the higher layer 107. Control information concerning scheduling required for control of the above-described each block is input into the control unit 119 from the higher layer 107, and the control information related to transmission is properly input from the control unit 119 as transmission control information into the each block of the encoding unit 109, the modulation unit 111, the RS generation unit 113, the multiplexing unit 115, and the transmission unit 117, and the control information related to reception is properly input from the control unit 119 as reception control information into the each block of the reception unit 101, the demodulation unit 103, and the decoding unit 105. In FIG. 1, components of the base station apparatus 3 other than the above are omitted since they are not related to the embodiment.

It is to be noted that although the handover parameter is preferably managed for each base station apparatus 3, a management method may be employed in which a control station apparatus upper than the base station apparatus 3 manages the handover parameter, and the upper control station apparatus suitably informs the base station apparatus 3 of the handover parameter or informs the base station apparatus 3 of the handover parameter according to a request of the base station apparatus 3.

Figure 2:
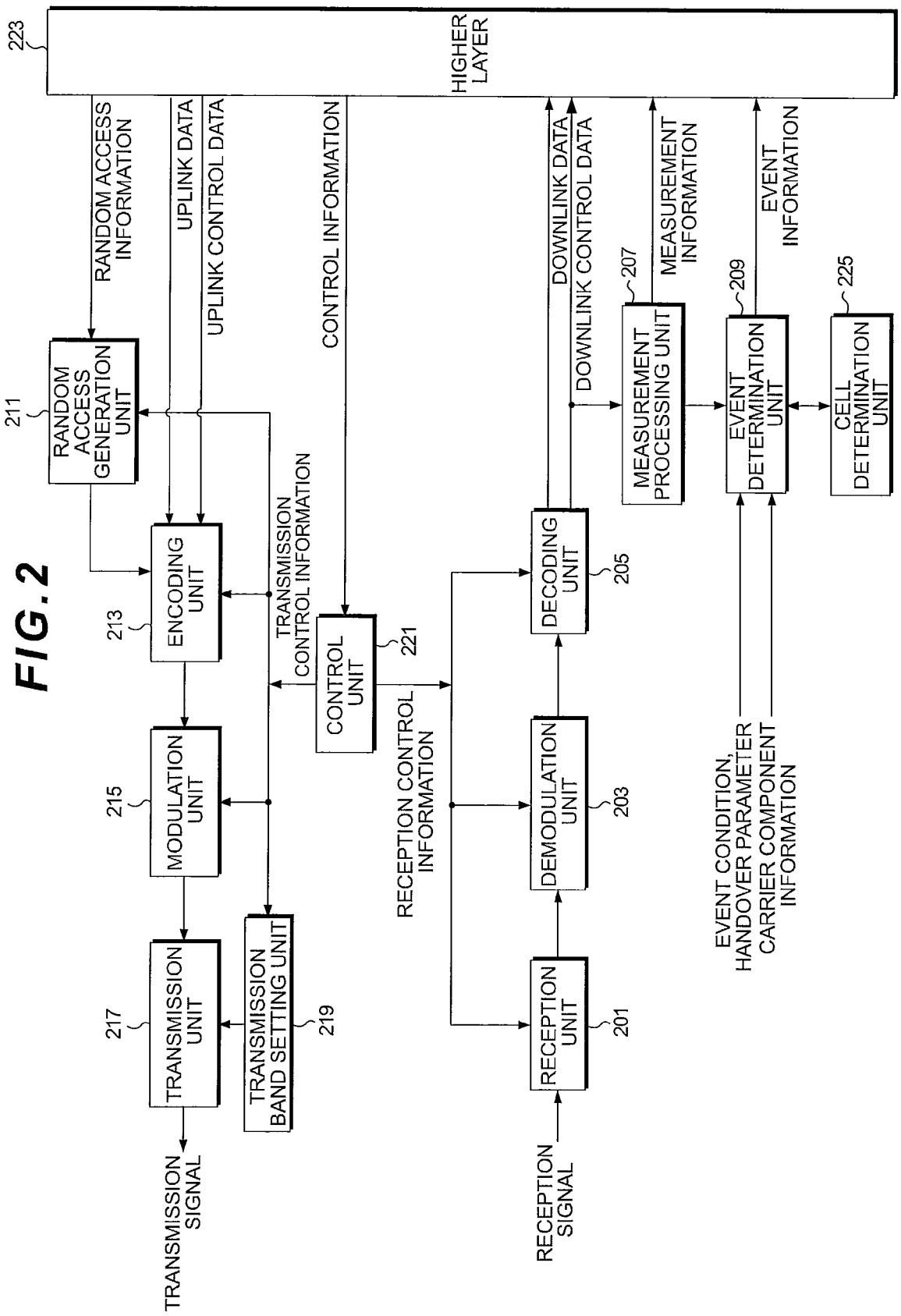
FIG. 2 is a block diagram showing a schematic configuration of a mobile station apparatus 1 according to the embodiment of the present invention.

FIG. 2 is a block diagram showing a schematic configuration of the mobile station apparatus 1 according to the embodiment of the present invention. The mobile station apparatus 1 includes: a reception unit 201; a demodulation unit 203; a decoding unit 205; a measurement processing unit 207; an event determination unit 209; a random access generation unit 211; an encoding unit 213; a modulation unit 215; a transmission unit 217; a transmission band setting unit 219; a control unit 221; an higher layer 223; and a cell determination unit 225. Prior to reception, control information is input into the control unit 221 from the higher layer 223, and control information concerning reception is properly input as reception control information into the reception unit 201, the demodulation unit 203, and the decoding unit 205. The reception control information includes information, such as reception timing concerning each channel, a multiplexing method, and radio resource allocation information in addition to information on the reception frequency band. The mobile station apparatus 1 may comprise a plurality of reception units 201 and transmission units 217.

A reception signal is received by the reception unit 201. The reception unit 201 receives the signal in a frequency band specified by the reception control information. The received signal is input into the demodulation unit 203. The demodulation unit 203 demodulates the received signal, inputs the signal into the decoding unit 205 to properly decode downlink data and downlink control data, and inputs the each decoded data into the higher layer 223. When a handover parameter is decoded, the handover parameter is input into the event determination unit 209. In addition, the handover parameter may be input into the event determination unit 209 from the higher layer 223. The measurement processing unit 207 performs measurement processing of reception qualities of a downlink reference signal for each cell and measurement processing based on a measurement result of a reception error rate of the physical downlink common channel or the physical downlink shared channel, and generates measurement information obtained by averaging (filtering) the measured reception qualities for each sample to then output the measurement information to the higher layer 223 and also to the event determination unit 209, if necessary.

If the mobile station apparatus 1 is being connected using Carrier Aggregation, carrier component information, which is the information for uniquely specifying a component carrier being connected by Carrier Aggregation, is input in the event determination unit 209 in addition to an event condition, the handover parameter, and the measurement information. The carrier component information may be any kind of form if it is the information on which the mobile station apparatus 1 can discriminate the component carrier being connected using Carrier Aggregation currently used for connection. For example, the carrier component information can also include ARFCN (Absolute Radio Frequency Channel Number) and a cell ID.

The event determination unit 209 inputs the input carrier component information into the cell determination unit 225. The cell determination unit 225 performs cell determination process in which a relation of each cell (carrier component) of a frequency to be measured is determined from the input carrier component information, and outputs cell determination result information, which is the determination result from the cell determination process, to the event determination unit 209. The cell determination result information indicates information on whether or not to adjust the handover parameter for each cell. In addition, the event determination unit 209 performs event determination process for evaluating whether or not the event condition (handover condition) is satisfied based on the input event condition, handover parameter, measurement information, and cell determination result information. Subsequently, when the event condition is satisfied, the event determination unit 209 outputs event information indicating the satisfied event condition to the higher layer 223. In the event information included are an event identifier (Event ID) that indicates at least a type of the satisfied event condition and the cell ID of the cell (carrier component) whose event condition has been satisfied. When a carrier component ID, which is the ID assigned for each carrier component, is used in order to identify the connected carrier component, the event determination unit 209 can also include the carrier component ID instead of the cell ID. The carrier component ID is assigned whenever the carrier component connected by Carrier Aggregation is instructed from the base station apparatus 3. The event determination unit 209 and the cell determination unit 225 can also serve as sub-function blocks of the higher layer 223. The event condition is informed by the higher layer 223.

In addition, prior to transmission, control information is input into the control unit 221 by the higher layer 223, and control information concerning transmission is appropriately input as transmission control information into the random access generation unit 211, the encoding unit 213, the modulation unit 215, and the transmission band setting unit 219. As uplink scheduling information of the transmission signal, the transmission control information includes information, such as encoding information, modulation information, information on a transmission frequency band, transmission timing concerning each channel, the multiplexing method, and radio resource allocation information. Random access information is input into the random access generation unit 211, and random access data is generated in the random access generation unit 211. Preamble information, radio resource information for transmission, etc. are included in the random access information.

Uplink data and uplink control data are input into the encoding unit 213 by the higher layer 223 in addition to the random access data. The encoding unit 213 appropriately encodes each data according to the transmission control information and outputs the encoded data to the modulation unit 215. The modulation unit 215 modulates the input from the encoding unit 213. The transmission band setting unit 219 sets a frequency band that is transmitted to the each transmission unit 217. The transmission unit 217 maps the output from the modulation unit 215 in a frequency domain and converts a signal in the frequency domain into a signal of a time domain, and places the converted signal on a carrier with a given frequency to perform power amplification, and transmits the converted signal. In addition, the event information input into the higher layer 223 is input as uplink data into the encoding unit 213 and the modulation unit 215, and the uplink data is appropriately allocated in a physical uplink shared channel to be transmitted as a transmission signal. The physical uplink shared channel in which the event information transmitted by the mobile station apparatus 1 has been allocated typically configures the layer 3 message (RRC message). In FIG. 2, components of the mobile station apparatus 1 other than the above are omitted since they are not related to the embodiment.

In addition, a correspondence relation similar to correspondence relations shown in FIGS. 13 and 14, respectively can be applied to a correspondence relation of a communication network configuration of a communication system in which the base station apparatus 3 and the mobile station apparatus 1 are arranged, and a frequency band.

Figure 3:
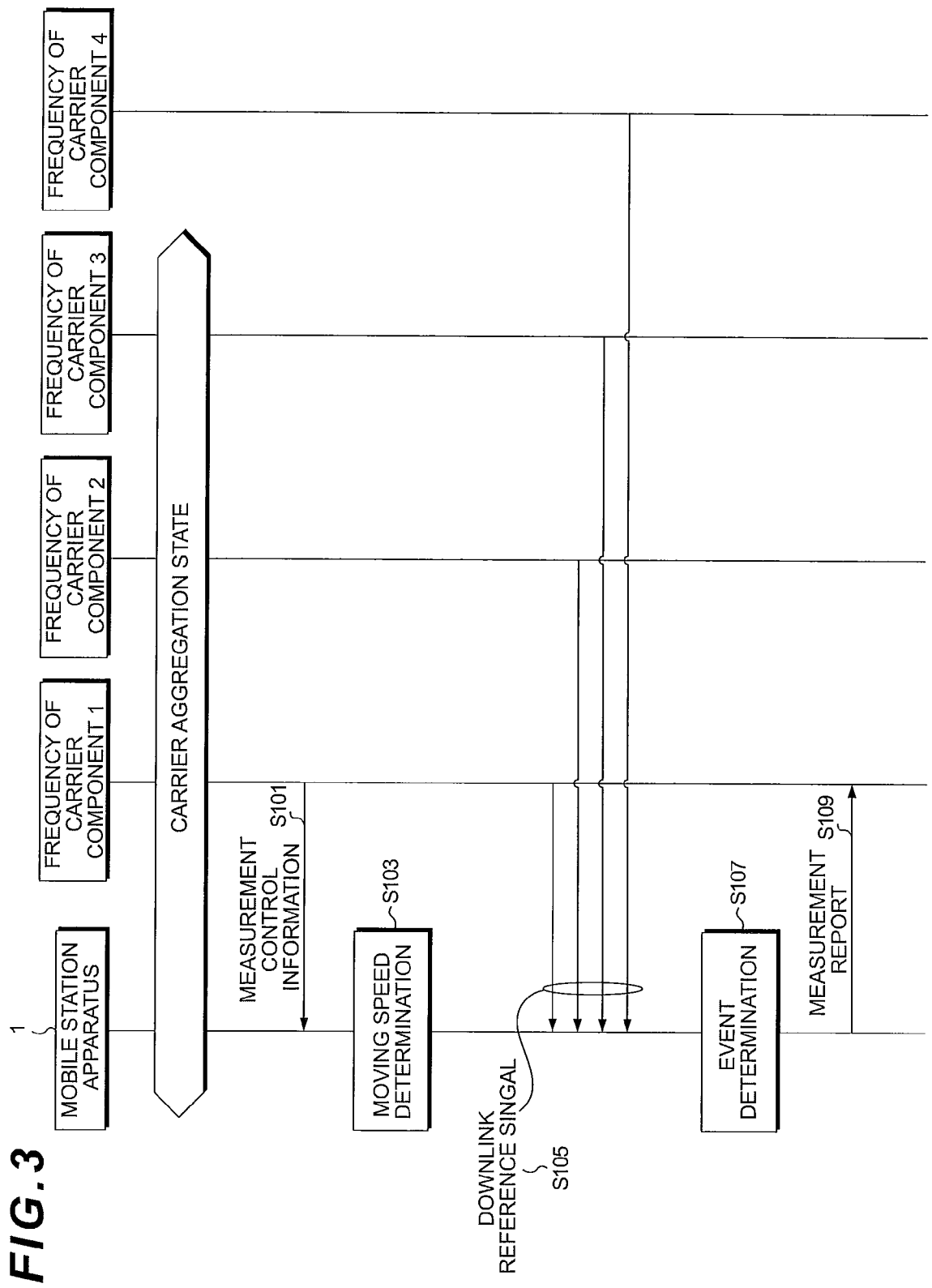
FIG. 3 is a sequence chart concerning measurement processing of the mobile station apparatus 1 according to the embodiment of the present invention.

FIG. 3 is a sequence chart concerning measurement processing of the mobile station apparatus 1 according to the embodiment of the present invention. A method of an event determination process concerning the present invention will be described using the sequence chart of FIG. 3. There exist the mobile station apparatus 1 and a frequency of a carrier component 1 to a frequency of a carrier component 4 (component carriers 1 to 4) in FIG. 3, and the process is started from a state where the mobile station apparatus 1 is being connected to the base station apparatus 3 using a frequency band of the frequency of the carrier component 1 to the frequency of the carrier component 3 by Carrier Aggregation (Carrier Aggregation state). The frequency of the carrier component 1 to the frequency of the carrier component 3 are different frequency bands from each other. The mobile station apparatus 1 receives spatially in the same place the frequency of the carrier component 1 to the frequency of the carrier component 3 to which Carrier Aggregation is performed. However, a cell radius of the frequency of the each carrier component may be different from each other. The frequency of the carrier component 4 has not been connected to the mobile station apparatus 1. The frequency of the carrier component 4 may be the same frequency as any of the frequency of the carrier component 1 to the frequency of the carrier component 3, and may be the different frequency therefrom. The frequency of the carrier component 4 may be a frequency used by another base station apparatus 3 disconnected to the mobile station apparatus 1.

Unless there is a particular description, a frequency of a carrier component means a set of a downlink component carrier and an uplink component carrier corresponding to the downlink component carrier. In addition, transmission to the frequency of the carrier component from the mobile station apparatus 1 in FIG. 3 means transmission to the base station apparatus 3 using the uplink component carrier, and transmission to the mobile station apparatus 1 from the frequency of the carrier component means transmission to the mobile station apparatus 1 from the base station apparatus 3 using the downlink component carrier. Hereinafter, there is a case where the frequency of the carrier component is suitably described by simply referring to it as the carrier component or the cell. A cell of a frequency of a carrier component measured by the mobile station apparatus 1 for event determination is particularly referred to as a cell to be measured. It is to be noted that although downlink or uplink radio resource allocation information by the physical downlink common channel is actually required prior to transmission and reception of each control message, the information is omitted in the drawings and in the description.

The base station apparatus 3 transmits measurement control information to the mobile station apparatus 1 using any of the frequencies of the carrier components (step S101). In the measurement control information, included are the event condition and the handover parameter (each parameter used for comparison of a reception quality for each cell to be measured and comparison of the reception quality of the cell to be measured with a threshold value (the offset value for each cell, the offset value for each frequency band, the hysteresis, the TTT), and the scaling factor). The measurement control information is set for each frequency band. In addition, the measurement control information may be transmitted as the broadcast information as common information in the cell, and may be transmitted as individual information on the connected mobile station apparatus 1. In addition, only the measurement control information may be transmitted as the layer 3 message, may be transmitted together with the layer 3 message concerning radio connection setting or radio connection setting change of the mobile station apparatus 1, and may be transmitted together with the downlink data. In addition, the measurement control information may be transmitted by being distributed into the plurality of layer 3 messages. Radio connection setting is, for example, RRC Connection Setup, and radio connection setting change is, for example, RRC Connection Reconfiguration.

The mobile station apparatus 1 continues holding the measurement control information transmitted from the base station apparatus 3 inside the mobile station apparatus 1 until it receives new measurement control information or until it completes connection to the base station apparatus 3. After holding the measurement control information, the mobile station apparatus 1 calculates mobile station apparatus speed information by determining one's own moving speed (step S103). Moving speed information is determined by comparing with a threshold value the number of cells moved by handover within a predetermined time. The base station apparatus 3 informs the mobile station apparatus 1 of the predetermined time and the threshold value that are used for determination. If, for example, the number of cells is less than a threshold value 1, the mobile station apparatus 1 determines the moving speed to be a speed S1, and if not less than the threshold value 1 and less than a threshold value 2, it determines to be a speed S2, and if not less than the threshold value 2, it determines to be a speed S3. The mobile station apparatus 1 can determine a further detailed moving speed by increasing the number of threshold values. The mobile station apparatus 1 holds the moving speed information determined by determining the moving speed inside the mobile station apparatus 1 as the handover parameter.

Subsequently, the mobile station apparatus 1 receives a downlink reference signal in the respective carrier components, respectively (step S105), and a reception quality is measured for each carrier component. Additionally, the mobile station apparatus 1 adds to the measured reception quality an offset value for each cell as the handover parameter, an offset value for each frequency band, an offset value for an event, and hysteresis in order to calculate the reception quality for each carrier component to be measured. Additionally the mobile station apparatus 1 compares the reception quality for each carrier component (cell) using the calculated reception quality, and determines whether or not the event condition is satisfied based on a time (TTT) required until the event condition is satisfied (step S107).

The mobile station apparatus 1 of the embodiment determines a relation for each carrier component from the carrier component information in event determination, and the event determination is performed after performing a parameter adjustment process that corrects a parameter used for the event condition according to a determination result. Additionally, when the event condition is satisfied, the mobile station apparatus 1 makes the satisfied event information included in a measurement report as the layer 3 message, and transmits the measurement report to the base station apparatus 3 using any of the connected carrier components (step S109). Although the mobile station apparatus 1 transmits the measurement report to the frequency of the carrier component 1 in FIG. 3, the measurement report may be transmitted to the other connected frequency of the carrier component 2 or frequency of the carrier component 3. The measurement report is, for example, a Measurement Report as the layer 3 message.

Figure 4:
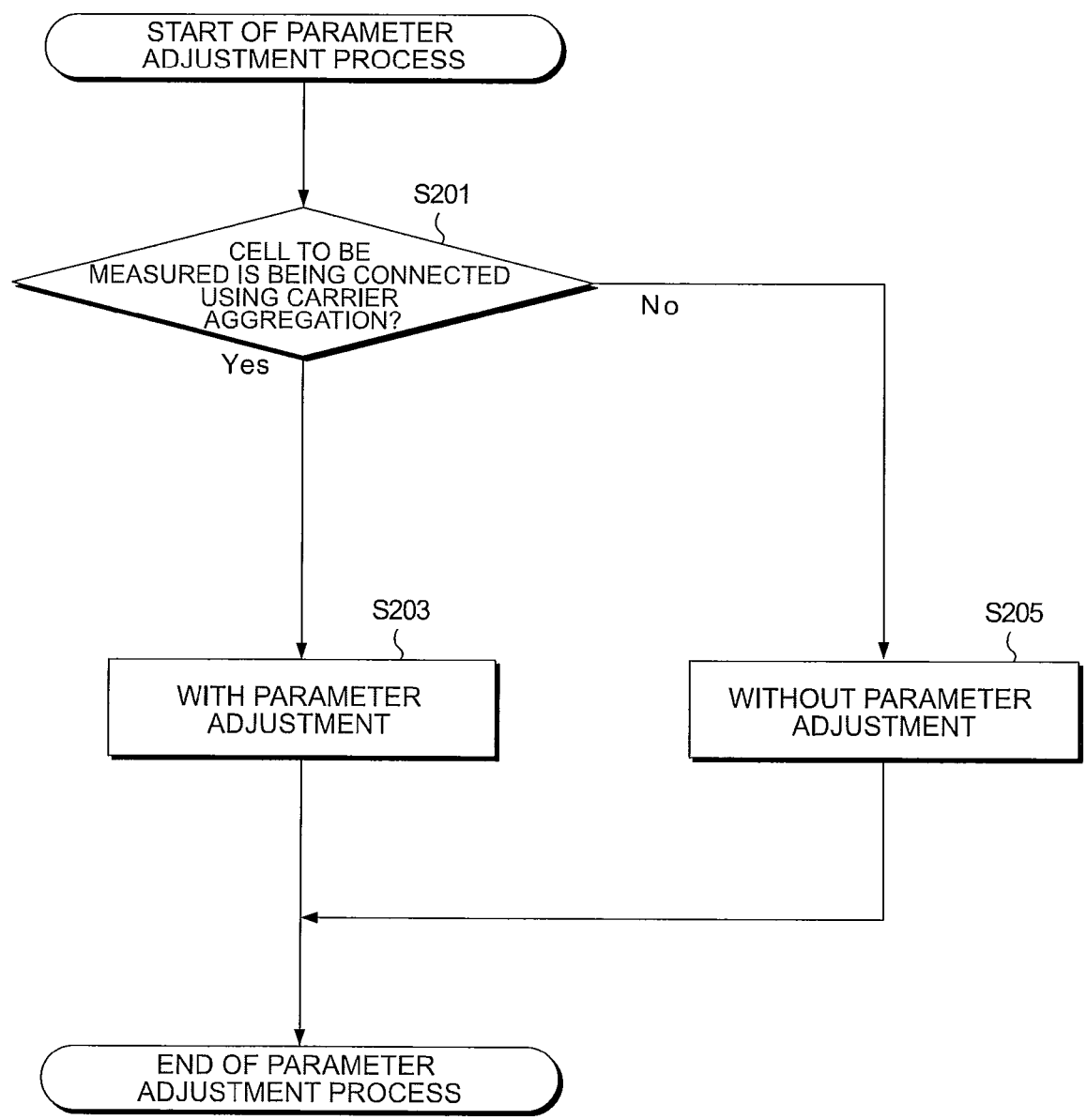
FIG. 4 is a flow chart showing a parameter adjustment process by the mobile station apparatus 1 according to a first embodiment of the present invention.

FIG. 4 is a flow chart showing a parameter adjustment process by the mobile station apparatus 1 according to the first embodiment of the present invention. The parameter adjustment process is executed as a part of processing when the reception quality is compared for each carrier component (cell) in the event determination process of FIG. 3. The mobile station apparatus 1 performs a cell determination process in which it is determined from carrier component information whether or not a cell to be measured is being connected using Carrier Aggregation (step S201). For example, if comparing the reception qualities of the frequency of the carrier component 1 and the frequency of the carrier component 2 in FIG. 3, the mobile station apparatus 1 determines that the cell to be measured is being connected using Carrier Aggregation, performs parameter adjustment, and the adjusted value is used (step S203). Meanwhile, if comparing the reception qualities of the frequency of the carrier component 1 and the frequency of the carrier component 4 in FIG. 3, the mobile station apparatus 1 determines that the cell to be measured is not being connected using Carrier Aggregation, does not perform parameter adjustment, and the informed value is used as it is (step S205).

Here, parameter adjustment is performed by correcting any of the handover parameters so as to be a value different from a value informed by the base station apparatus 3. For example, the offset value (Off)) for the event is increased. Alternatively, the hysteresis to adjust a reception quality of a neighboring cell is reduced. Alternatively, the time (TTT) to show the time required until the event condition is satisfied is extended.

In addition, there is a method for correcting the informed event condition by adding a new handover parameter to the event condition as an other control content of the parameter adjustment. For example, an offset value (COff) for the carrier component being connected using Carrier Aggregation is added to the reception quality of the measured carrier component. In addition, in a case where the parameter adjustment is performed by setting the above-described respective handover parameters (the TTT, the Off, the Hysteresis, and the COff) to be infinity, respectively, the event condition may be made not to be satisfied. It is to be noted that any parameter adjustment method may be used without limiting to the above-indicated correction method as long as the parameter adjustment method is the method with which satisfaction of the event condition is more suppressed than usual.

Figure 5:
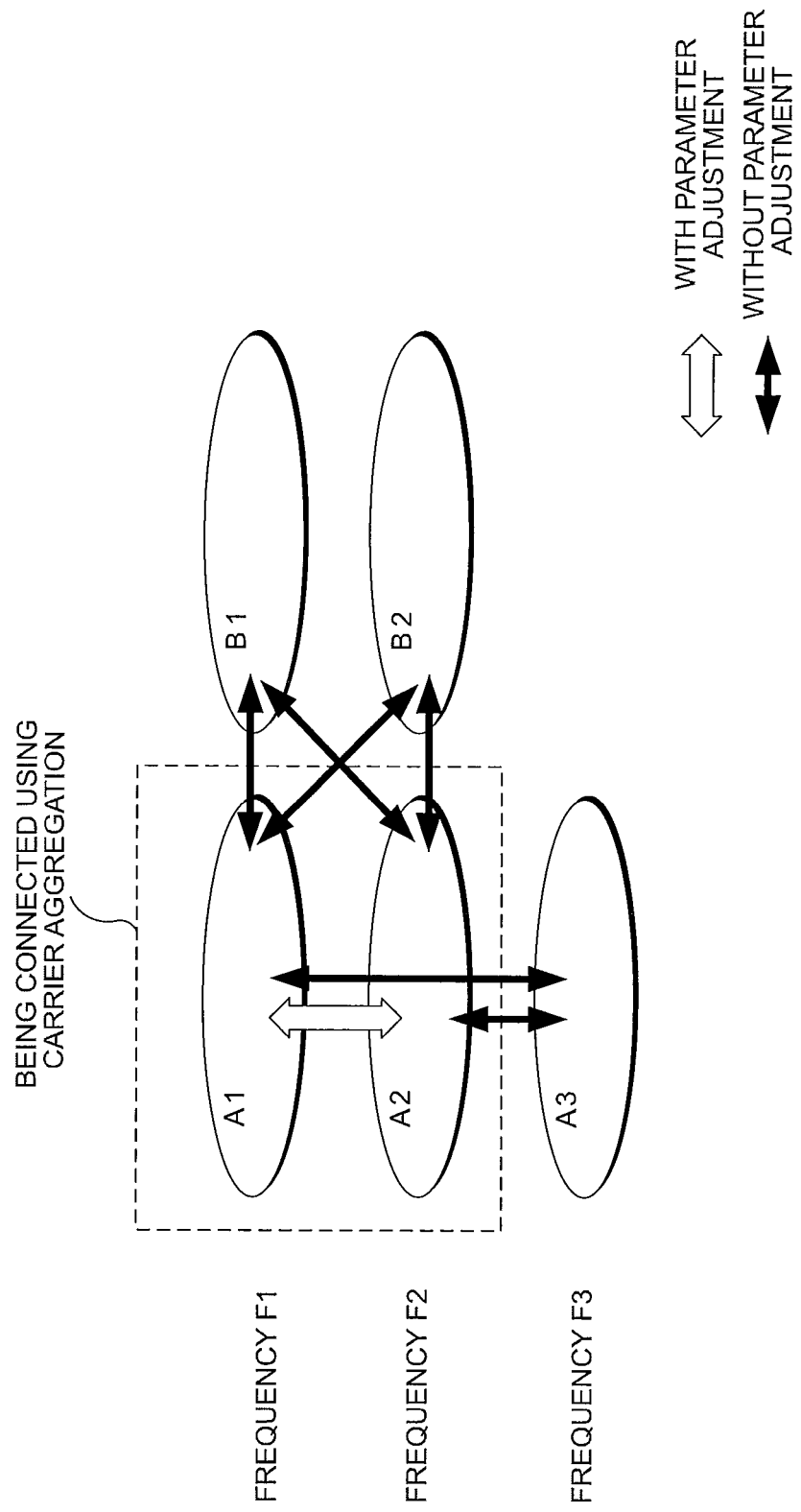
FIG. 5 is an illustration showing whether or not parameter adjustment is performed when the mobile station apparatus 1 according to the first embodiment of the present invention compares reception qualities of carrier components (cells)

FIG. 5 is an illustration showing whether or not parameter adjustment is performed when the mobile station apparatus 1 according to the first embodiment of the present invention compares the reception qualities of the carrier components (cells). Cells A1 to A3 are the cells arranged spatially in the same area and operated in frequencies F1 to F3 different from each other. Similarly, cells B1 and B2 are also the cells arranged spatially in the same area and operated in the frequencies F1 to F2 different from each other. At this time, when the cells A1 and A2 are connected to a certain mobile station apparatus 1 using Carrier Aggregation and when the mobile station apparatus 1 compares reception qualities of the cells A1 and A2 with each other, the mobile station apparatus 1 performs parameter adjustment. When the mobile station apparatus 1 compares the reception qualities of the other cells, parameter adjustment is not performed (for example, comparison of the cell A1 and the cell B1).

As described above, in the first embodiment, parameter adjustment used for the event condition is implemented when the reception quality is compared for each connected carrier component using Carrier Aggregation. Namely, when two carrier components to be compared are being connected using Carrier Aggregation, satisfaction of the event condition is suppressed in the carrier components when the mobile station apparatus 1 performs parameter adjustment.

As described above, the mobile station apparatus 1 appropriately adjusts the parameter based on the handover parameter informed by the base station apparatus 3 and the carrier component information that indicates whether or not the carrier component is being connected using Carrier Aggregation. Consequently, the mobile station apparatus 1 appropriately sets the event condition for each measured carrier component to perform event determination, thus enabling to perform efficient event determination. When the mobile station apparatus 1 performs parameter adjustment, satisfaction of the event condition is suppressed more than usual. As described above, since an unnecessary event condition is not satisfied and report of event information is suppressed from occurring, power consumption in the mobile station apparatus 1 can be reduced. In addition, since a probability of communication disconnection and a probability of handover failure associated with unnecessary handover processing are reduced, a communication quality in the mobile station apparatus 1 improves. In addition, since a radio resource for reporting the event information is suppressed from being consumed, a utilization efficiency of the radio resource improves. Since the base station apparatus 3 controls the handover based on the measurement report from the mobile station apparatus 1, complex control becomes unnecessary, thus resulting in the reduced complexity of scheduling.

Second Embodiment

A second embodiment of the present invention will be described hereinafter. The embodiment relates to a method for adjusting a parameter of an event condition for the mobile station apparatus 1 to efficiently perform event determination when a reference cell is set when the mobile station apparatus 1 compares a reception quality of each carrier component.

Since configurations of the base station apparatus 3 and the mobile station apparatus 1 of the embodiment may be the same as in the first embodiment, a description of the configurations will be omitted. However, the configurations differ in a point where reference cell information is included in carrier component information input into the event determination unit of the mobile station apparatus 1. In addition, a correspondence relation similar to the correspondence relations shown in FIGS. 13 and 14, respectively can be applied to a correspondence relation of a communication network configuration of a communication system in which the base station apparatus 3 and the mobile station apparatus 1 are arranged, and a frequency band. A sequence chart concerning event determination may be the same as FIG. 3.

A carrier component (reference cell) used as a criterion when the mobile station apparatus 1 compares the reception quality for each carrier component may be called an anchor component carrier (set of an anchor uplink component carrier and an anchor downlink component carrier) or an anchor cell. The reference cell may be common for each cell, and may be individually specified for each mobile station apparatus 1. The reference cell may be explicitly specified from the base station apparatus 3 to the mobile station apparatus 1, or may be implicitly specified. The mobile station apparatus 1 may select the reference cell with an arbitrary method, and the selected result may be reported to the base station apparatus 3. The mobile station apparatus 1 may receive the physical downlink common channel of only the carrier component as the reference cell, or may perform measurement of the downlink reception quality of only the carrier component as the reference cell. The base station apparatus 3 may set the event condition only for comparison with the carrier component as the reference cell. As described above, since a measurement method focused on the carrier component as the reference cell can be performed by setting the reference cell for the mobile station apparatus 1, control required for measurement processing of the mobile station apparatus 1 is simplified.

Figure 6:
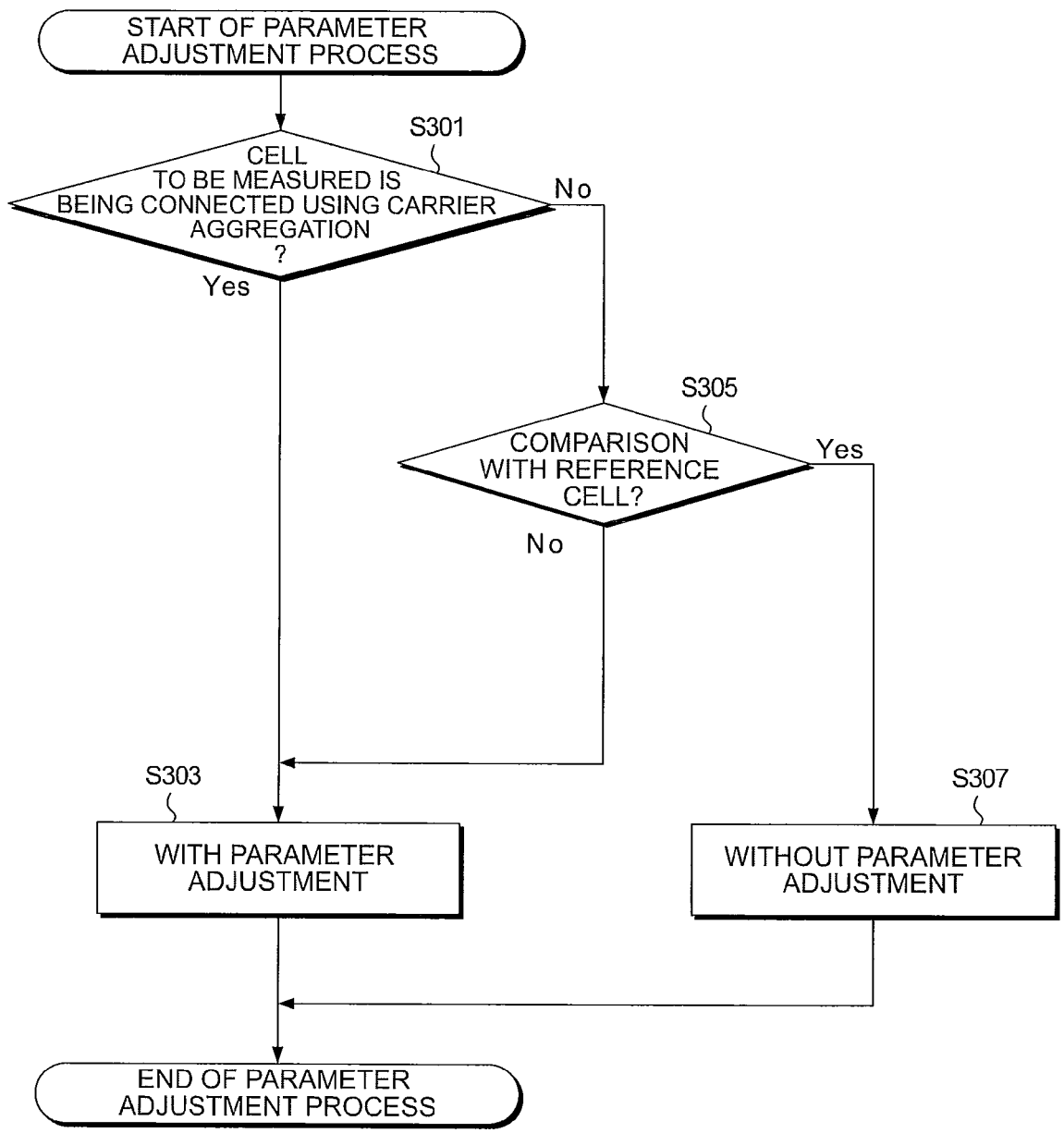
FIG. 6 is a flowchart showing a parameter adjustment process by the mobile station apparatus 1 according to a second embodiment of the present invention.

FIG. 6 is a flow chart showing parameter adjustment processing by the mobile station apparatus 1 according to the second embodiment of the present invention. The mobile station apparatus 1 performs cell determination processing in which it is determined from carrier component information whether or not a cell to be measured is being connected using Carrier Aggregation (step S301). In addition, the mobile station apparatus 1 understands which carrier component the reference cell is. If the cell to be measured is being connected using Carrier Aggregation, the mobile station apparatus 1 performs parameter adjustment and uses the adjusted value (step S303). Meanwhile, if the cell to be measured is not being connected using Carrier Aggregation, the mobile station apparatus 1 determines whether or not the cell to be measured is a comparison with the reference cell (step S305). If the cell to be measured is the comparison with the reference cell, the mobile station apparatus 1 does not perform parameter adjustment and uses the informed value as it is (step S307).

Namely, carrier component information in the second embodiment needs to include at least information on whether or not the carrier component whose reception quality is compared by the mobile station apparatus 1 is being connected using Carrier Aggregation, and information with which the reference cell can be identified. Since the method described in the first embodiment can be used as the method of parameter adjustment, a description of the method will be omitted.

Figure 7:
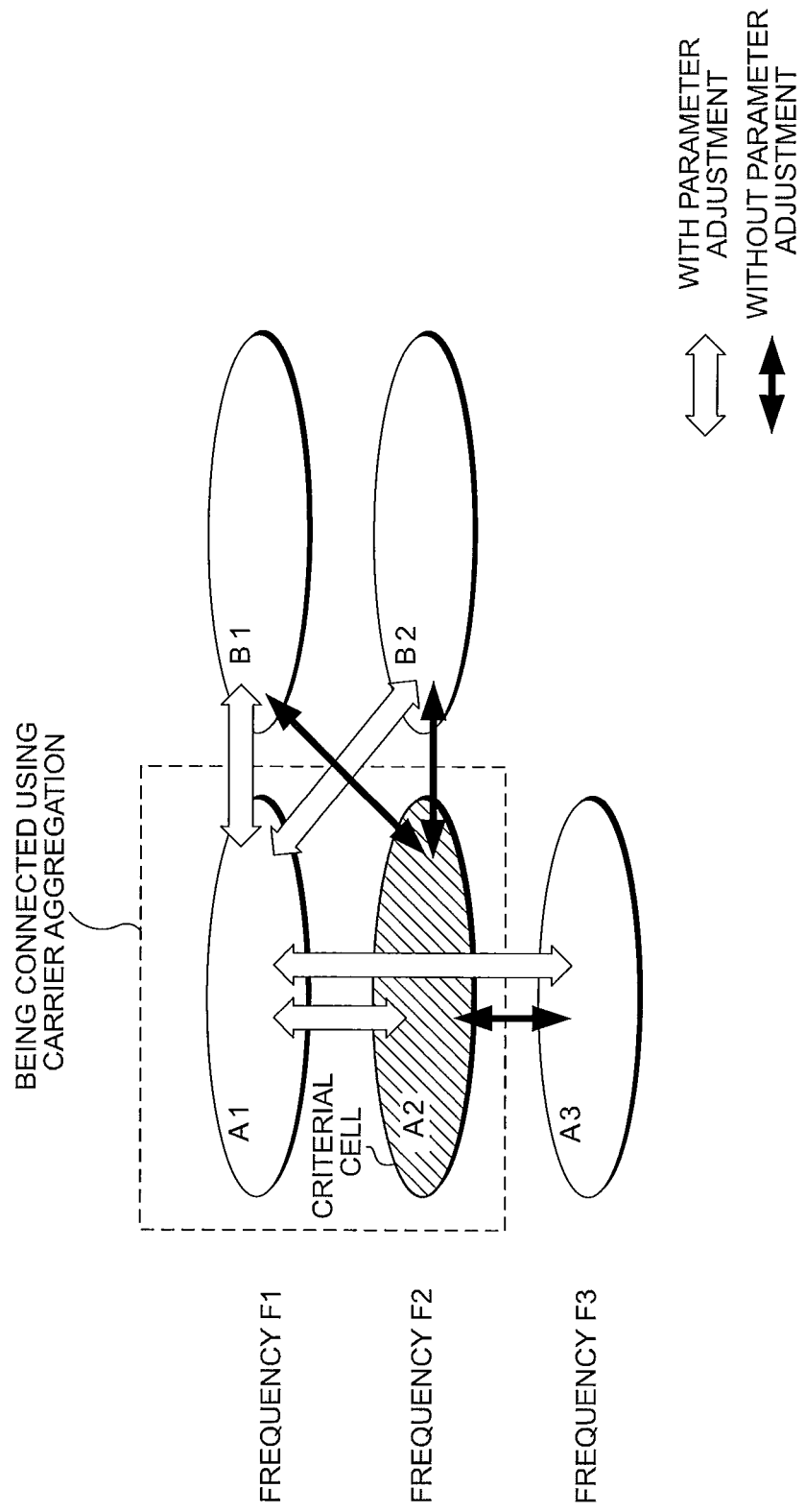
FIG. 7 is an illustration showing whether or not parameter adjustment is performed when the mobile station apparatus 1 according to the second embodiment of the present invention compares a reception quality for each carrier component (cell)

FIG. 7 is an illustration showing whether or not parameter adjustment is performed when the mobile station apparatus 1 according to the second embodiment of the present invention compares a reception quality for each carrier component (cell). Since each component of FIG. 7 is the same as in FIG. 5, details are omitted. However, the cell A2 is the reference cell. At this time, when the cells A1 and A2 are being connected to a certain mobile station apparatus 1 using Carrier Aggregation and when the mobile station apparatus 1 compares reception qualities of the cells A1 and A2, the mobile station apparatus 1 performs parameter adjustment. When the mobile station apparatus 1 compares the reception qualities of the cells other than the cells A1 and A2, the mobile station apparatus 1 does not perform parameter adjustment (for example, comparison of the cell A1 and the cell B1) if the comparison is the comparison of the reception quality with the reference cell. When the mobile station apparatus 1 compares the reception quality with the cell other than the reference cell, parameter adjustment is performed (for example, comparison of the cell A1 and the cell B2).

As described above, in the second embodiment, parameter adjustment used for the event condition is implemented when the mobile station apparatus 1 compares the reception qualities between the carrier components other than the reference cell in addition to when the reception quality is compared for each carrier component being connected using Carrier Aggregation. Namely, when two carrier components compared by the mobile station apparatus 1 are being connected using Carrier Aggregation or when neither of the two carrier components is the reference cell, satisfaction of the event condition is suppressed in the carrier components when the mobile station apparatus 1 performs parameter adjustment.

As described above, the mobile station apparatus 1 appropriately adjusts the parameter based on the handover parameter informed by the base station apparatus 3 and carrier component information that indicates whether or not the carrier component whose reception quality is compared by the mobile station apparatus 1 is being connected using Carrier Aggregation and whether or not it is the reference cell. Consequently, the mobile station apparatus 1 appropriately sets the event condition for each measured carrier component to perform event determination, thus enabling to perform efficient event determination. When the mobile station apparatus 1 adjusts the parameter, satisfaction of the event condition is suppressed more than usual. As described above, since the unnecessary event condition is not satisfied and the report of the event information is suppressed from occurring, power consumption in the mobile station apparatus 1 can be reduced. In addition, since the probability of communication disconnection and the probability of the handover failure associated with the unnecessary handover processing are reduced, the communication quality in the mobile station apparatus 1 improves. In addition, since the radio resource for reporting the event information is suppressed from being consumed, the utilization efficiency of the radio resource improves. Since the base station apparatus 3 controls the handover based on the measurement report from the mobile station apparatus 1, complex control becomes unnecessary, thus resulting in the reduced complexity of scheduling. In addition, it becomes possible to simplify the measurement method by using the reference cell, thus enabling to reduce complexity of controlling the mobile station apparatus 1 or the base station apparatus 3.

Third Embodiment

A third embodiment of the present invention will be described hereinafter. The embodiment shows an event determination method for determining whether or not event determination is performed for each carrier component when the mobile station apparatus 1 compares the reception quality of each carrier component.

Since configurations of the base station apparatus 3 and the mobile station apparatus 1 of the embodiment may be the same as in the first embodiment, a description of the configurations will be omitted. The reference cell information may be included in the carrier component information input into the event determination unit of the mobile station apparatus 1, or may not be included therein. In addition, a correspondence relation similar to correspondence relations shown in FIGS. 13 and 14, respectively can be applied to a correspondence relation of a communication network configuration of a communication system in which the base station apparatus 3 and the mobile station apparatus 1 are arranged, and a frequency band. A sequence chart concerning event determination may be the same as FIG. 3.

Figure 8:
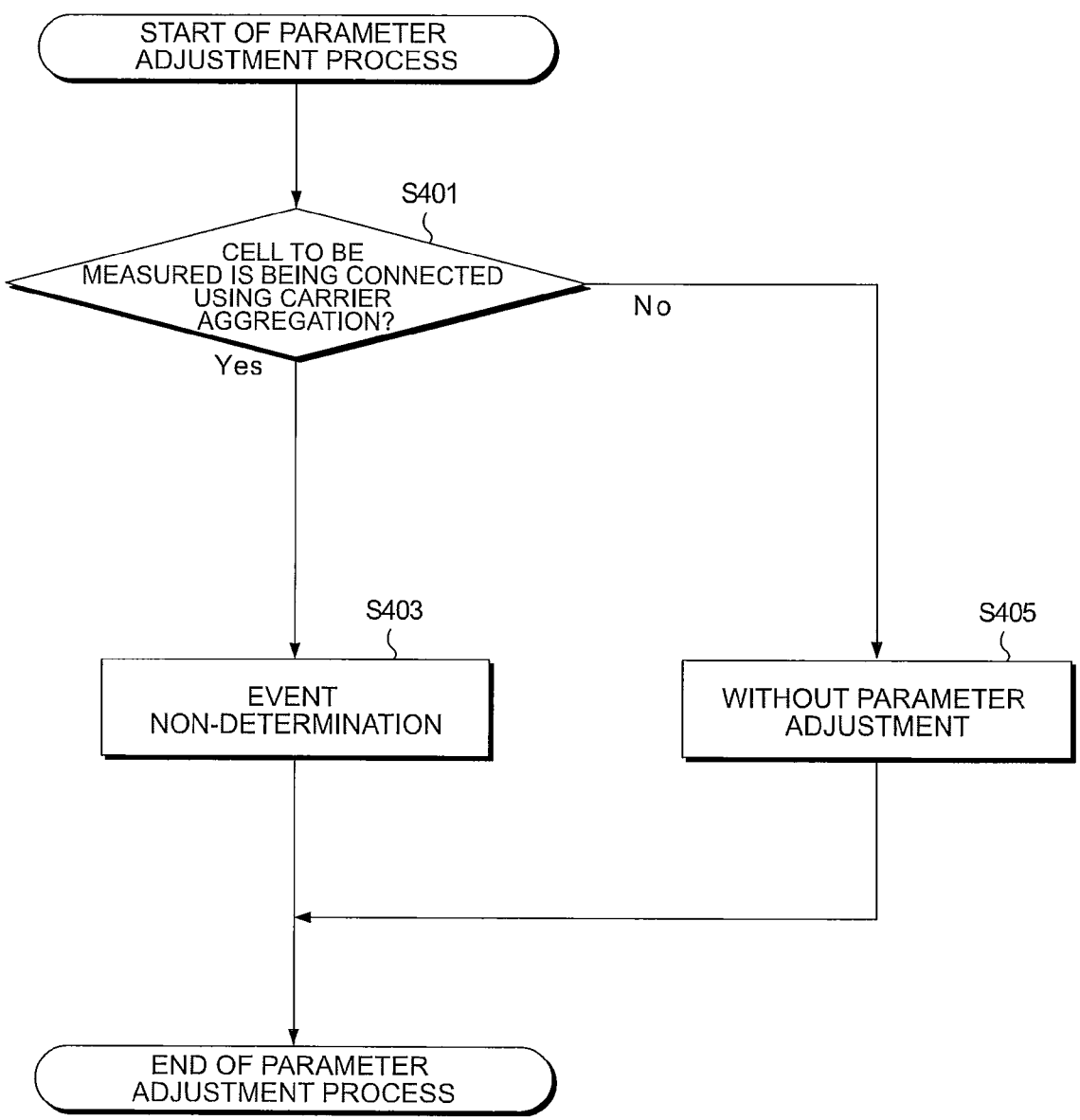
FIG. 8 is a flow chart showing a parameter adjustment process by the mobile station apparatus 1 according to a third embodiment of the present invention.

FIG. 8 is a flow chart showing a parameter adjustment process by the mobile station apparatus 1 according to the third embodiment of the present invention. The mobile station apparatus 1 performs a cell determination process in which it is determined from carrier component information whether or not a cell to be measured is being connected using Carrier Aggregation (step S401). If the cell to be measured is being connected using Carrier Aggregation, the mobile station apparatus 1 determines that the cell to be measured is an event non-determination cell, which does not need event determination, and a reception quality of the cell to be measured is not used for event determination (step S403). Meanwhile, if the cell to be measured is not being connected using Carrier Aggregation, the mobile station apparatus 1 does not perform parameter adjustment and uses the informed value as it is (step S405).

Figure 9:
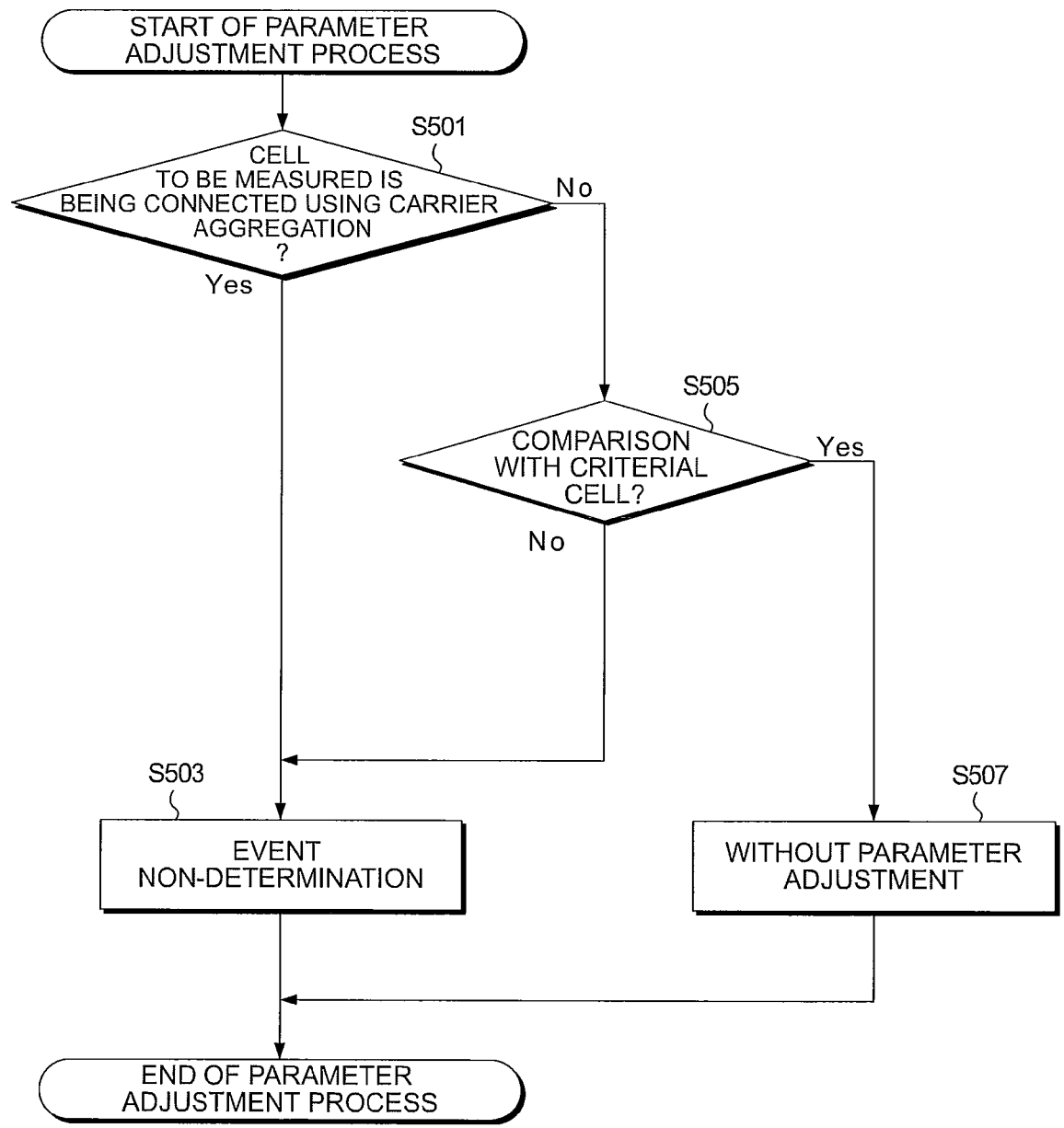
FIG. 9 is a flow chart showing a parameter adjustment process when a reference cell is specified in the mobile station apparatus 1 according to the third embodiment of the present invention.

FIG. 9 is a flow chart showing a parameter adjustment process when a reference cell is specified in the mobile station apparatus 1 according to the third embodiment of the present invention. Another method of the parameter adjustment process in the mobile station apparatus 1 of the third embodiment will be described using the flow chart of FIG. 9. The mobile station apparatus 1 performs a cell determination process in which it is determined from carrier component information whether or not a cell to be measured is being connected using Carrier Aggregation (step S501). In addition, the mobile station apparatus 1 understands which carrier component the reference cell is. If the cell to be measured is being connected using Carrier Aggregation, the mobile station apparatus 1 determines that the cell is an event non-determination cell, and a reception quality of the cell to be measured is not used for event determination (step S503). Meanwhile, if the cell to be measured is not being connected using Carrier Aggregation, the mobile station apparatus 1 determines whether or not the cell to be measured is a comparison with the reference cell (step S505). If the cell to be measured is the comparison with the reference cell, the mobile station apparatus 1 does not perform parameter adjustment and uses the informed value as it is (step S507).

It is to be noted that as control of the mobile station apparatus 1 when the mobile station apparatus 1 determines the cell to be measured to be the event non-determination cell in the parameter adjustment process, an other method may be used as long as the method is the method in which the mobile station apparatus 1 does not report satisfaction of an event condition to the base station apparatus 3 when the event condition informed by the base station apparatus 3 is satisfied. For example, although the mobile station apparatus 1 performs event determination as usual, a method of not reporting to the base station apparatus 3, etc. may be used that the event condition is satisfied in the event non-determination cell.

The base station apparatus 3 can also explicitly specify for each cell whether or not the parameter adjustment process is performed. For example, the base station apparatus 3 can also specify that the parameter adjustment processing method is applied only to a specific event condition in a certain cell, and that it is not applied to the other event conditions.

FIG. 10 is one example of a table referred to to specify a cell for which the parameter adjustment process is implemented or not for each event condition when the base station apparatus 3 according to the third embodiment of the present invention informs the mobile station apparatus 1 of the event condition. It is to be noted that the base station apparatus 3 may inform the mobile station apparatus 1 in a cell of the table shown in FIG. 10 using broadcast information, may inform individually for each mobile station apparatus 1, and may inform for each event condition to be informed when the event condition is informed for each mobile station apparatus 1. A preferred informing method is the method in which a cell ID indicating an event non-determination cell or a cell ID group (it may be a range specification indicating the beginning and the end of continuous cell IDs) indicating a plurality of cell IDs is specified for each event condition to be set with respect to measurement control information used when the base station apparatus 3 informs the mobile station apparatus 1 of the event condition, and the base station apparatus 3 informs the mobile station apparatus 1 of the table shown in FIG. 10. Namely, the base station apparatus 3 sets event determination information that specifies whether or not making the mobile station apparatus 1 perform event determination with respect to one or more specified cell IDs, and transmits the event determination information to the mobile station apparatus 1 together with the measurement control information.

As described above, in the third embodiment, event determination is not performed when the mobile station apparatus 1 performs comparison of the reception quality for each carrier component being connected using Carrier Aggregation. Namely, if two carrier components compared by the mobile station apparatus 1 are being connected using Carrier Aggregation, satisfaction of the event condition is suppressed in the carrier components when the mobile station apparatus 1 does not perform event determination.

As described above, the mobile station apparatus 1 determines whether or not the event determination is performed based on carrier component information that indicates whether or not the carrier component whose reception quality is compared by the mobile station apparatus 1 is being connected using Carrier Aggregation. Consequently, the mobile station apparatus 1 sets the event condition for each measured carrier component to perform event determination, thus enabling to perform efficient event determination. When the mobile station apparatus 1 does not perform event determination, satisfaction of the event condition is suppressed more than usual. As described above, since an unnecessary event condition is not satisfied and event report is suppressed from occurring, power consumption in the mobile station apparatus 1 can be reduced. In addition, since a probability of communication disconnection and a probability of handover failure associated with unnecessary handover processing are reduced, a communication quality in the mobile station apparatus 1 improves. In addition, since a radio resource for reporting the event is suppressed from being consumed, a utilization efficiency of the radio resource improves. In addition, since the base station apparatus 3 can explicitly specify to the mobile station apparatus 1 whether or not event determination is performed for each cell, flexible handover control based on actual arrangement of the base station apparatus 3 can be performed.

Fourth Embodiment

A fourth embodiment of the present invention will be described hereinafter. The embodiment shows an event determination method when the mobile station apparatus 1 moving at high speed performs comparison of a reception quality of each carrier component. Since configurations of the base station apparatus 3 and the mobile station apparatus 1 of the embodiment may be the same as in the first embodiment, a description of the configurations will be omitted. The reference cell information may be included in the carrier component information input into the event determination unit of the mobile station apparatus 1, or may not be included therein. In addition, a correspondence relation similar to the correspondence relations shown in FIGS. 13 and 14, respectively can be applied to a correspondence relation of a communication network configuration of a communication system in which the base station apparatus 3 and the mobile station apparatus 1 are arranged, and a frequency band. A sequence chart concerning event determination may be the same as FIG. 3.

The mobile station apparatus 1 adjusts a time (TTT) required until the event condition is satisfied in event determination based on moving speed information, a scaling factor, and carrier component information. The mobile station apparatus 1 does not shorten (or extend) a value of the TTT based on the scaling factor in the carrier component determined that "parameter adjustment is performed" in the first embodiment or the second embodiment. In the embodiment, only the embodiment can be applied as a method of parameter adjustment, and the embodiment can be applied by combining with the first embodiment or the second embodiment. When the embodiment can be applied by combining with the first embodiment or the second embodiment, it is preferable that the parameter adjustment process in the first embodiment or the second embodiment can be performed on parameters other than the TTT.

As described above, in the fourth embodiment, the mobile station apparatus 1 moving at high speed does not apply to the carrier component the scaling factor applied when comparison of the reception quality of the carrier component being connected using Carrier Aggregation is performed. Namely, when two carrier components compared by the mobile station apparatus 1 are being connected using Carrier Aggregation, satisfaction of the event condition is suppressed in the carrier components by the mobile station apparatus 1 not applying the scaling factor to the carrier components.

As described above, the mobile station apparatus 1 moving at high speed appropriately adjusts the parameter based on the handover parameter informed by the base station apparatus 3 and the carrier component information that indicates whether or not the carrier component whose reception quality is compared by the mobile station apparatus 1 is being connected using Carrier Aggregation. Consequently, the mobile station apparatus 1 sets the event condition for each measured carrier component to perform event determination, thus enabling to perform efficient event determination. When the mobile station apparatus 1 adjusts the parameter, satisfaction of the event condition is suppressed more than usual. As described above, since an unnecessary event condition is not satisfied and report of event information is suppressed from occurring, power consumption in the mobile station apparatus 1 can be reduced. In addition, since a probability of communication disconnection and a probability of handover failure associated with unnecessary handover processing are reduced, a communication quality in the mobile station apparatus 1 improves. In addition, since a radio resource for reporting the event information is suppressed from being consumed, a utilization efficiency of the radio resource improves.

Although has been described above the method for suppressing the event condition concerning the unnecessary handover in the mobile station apparatus 1 being connected to the base station apparatus 3 using one or more carrier components by Carrier Aggregation, an applicable scope of the present invention is not limited to the event condition concerning the handover, and it can also be applied to all the event conditions informed to the mobile station apparatus 1 by the base station apparatus 3. An event condition to be suppressed can be individually specified by the base station apparatus 3.

It is to be noted that the embodiments described above are mere exemplifications, and the present invention can be achieved using various modified examples and replaced examples. Although the mobile station apparatus 1 and the base station apparatus 3 of the embodiments have been described using the functional block diagrams for the purpose of explanation, in a computer readable recording medium recorded is a program for achieving functions or a part of the functions of the respective units of the mobile station apparatus 1 and the base station apparatus 3, a computer system is caused to read the program recorded in the recording medium and executes it, and thereby control of the mobile station apparatus 1 and the base station apparatus 3 may be performed. It is to be noted that the "computer system" herein is defined to include an OS and hardware, such as a peripheral device.

In addition, the "computer readable recording medium" refers to a portable medium, such as a flexible disk, a magneto-optical disc, a ROM, and a CD-ROM, and a storage device, such as a hard disk incorporated in the computer system. Further, the "computer readable recording medium" is defined to also include a medium that dynamically holds a program for a short time as a communication line used for transmitting a program via communication lines, such as a network like the Internet etc., and a telephone line, and a medium that holds the program for a certain time as a volatile memory serving as a server or a client inside the computer system. In addition, the above-described program may be a program for achieving a part of the above-mentioned functions, or it may be a program that can achieve the above-mentioned functions in combination with a program already recorded in the computer system. In addition, each functional block used in the above-described each embodiment may be typically achieved as an LSI, which is an integrated circuit. The each functional block may be individually made into a chip, or a part or all of the functional blocks may be integrated to form a chip. In addition, a technique of making the functional blocks into the integrated circuit may be achieved as not only the LSI but a dedicated circuit or a general-purpose processor. In addition, when a technology of making functional blocks into the integrated circuit as an alternative of the LSI appears due to the advanced semiconductor technology, it is also possible to use the integrated circuit according to the technology.

Although the embodiments of the present invention have been mentioned in detail with reference to the drawings, concrete configurations are not limited to the embodiments, and a design etc. without departing from the gist of the present invention are also included in claims.

INDUSTRIAL APPLICABILITY

Description of Symbols

1 MOBILE STATION APPARATUS
3 BASE STATION APPARATUS
101 RECEPTION UNIT
103 DEMODULATION UNIT
105 DECODING UNIT
107 HIGHER LAYER
109 ENCODING UNIT
111 MODULATION UNIT
113 RS GENERATION UNIT
115 MULTIPLEXING UNIT
117 TRANSMISSION UNIT
119 CONTROL UNIT
201 RECEPTION UNIT
203 DEMODULATION UNIT
205 DECODING UNIT
207 MEASUREMENT PROCESSING UNIT
209 EVENT DETERMINATION UNIT
11 RANDOM ACCESS GENERATION UNIT
213 ENCODING UNIT
215 MODULATION UNIT
217 TRANSMISSION UNIT
219 TRANSMISSION BAND SETTING UNIT
221 CONTROL UNIT
223 HIGHER LAYER
225 CELL DETERMINATION UNIT

The invention claimed is:

1. A mobile station apparatus comprising:
a control circuit configured or programmed to communicate with a base station apparatus using a first cell and a second cell;
a reception circuit configured or programmed to receive measurement control information including first information, second information and third information, wherein
the first information indicates an event,
the second information indicates parameters for evaluating a condition of the event for comparison of reception quality of an applicable cell with reception quality of the second cell, and
the third information indicates a list of one or more cell identifications, the list identifying one or more cells not to be considered in evaluating the condition; an event determination circuit configured or programmed to:
determine whether or not a neighboring cell is the applicable cell based on the list,
determine whether or not a cell detected on an associated frequency to be measured is the neighboring cell based on whether or not the detected cell is the second cell, where the first cell and the second cell are configured for a carrier aggregation, and
evaluate the condition of the event for the applicable cell, wherein
the second cell is not the neighboring cell, and
a frequency of the applicable cell is the same frequency as a frequency of the second cell; and
a transmitting circuit configured or programmed to report a measurement result based on the condition of the event for the applicable cell in a case that the condition is fulfilled.

2. The mobile station apparatus according to claim 1, wherein
the event determination circuit is configured to or programmed to determine whether each of the other cells is not the applicable cell in a case that each of the other cells is used by the mobile station apparatus.

3. A base station apparatus comprising:
a control circuit configured or programmed to communicate with a mobile station apparatus using a first cell and a second cell;
a transmission circuit configured or programmed to transmit measurement control information including first information, second information and third information, wherein
the first information indicates an event,
the second information parameters for evaluating a condition of the event for comparison of reception quality of an applicable cell with reception quality of the second cell,
the third information indicates a list of one or more cell identifications, the list identifying one or more cells not to be considered in evaluating the condition, a neighboring cell is determined as the applicable cell based on the list, a cell detected on an associated frequency is determined as the neighboring cell based on whether or not the cell is the second cell, where the first cell and the second cell are configured for a carrier aggregation, the second cell is not the neighboring cell, a frequency of the applicable cell is the same frequency as a frequency of the second cell, and the condition of the event for the applicable cell is evaluated; and a receiving circuit configured or programmed to receive a measurement result based on the condition of the event for the applicable cell in a case that the condition is fulfilled.

4. A processing method performed in a mobile station apparatus, the processing method comprising:

communicating with a base station apparatus using a first cell and a second cell;

receiving measurement control information including first information, second information and third information, wherein the first information indicates an event, the second information indicates parameters for evaluating a condition of the event for comparison of reception quality of an applicable cell with reception quality of the second cell, the third information indicates a list of one or more cell identifications, the list identifying one or more cells not to be considered in evaluating the condition;

determining whether or not a neighboring cell is the applicable cell based on the list;

determining whether or not a cell detected on an associated frequency to be measured is the neighboring cell based on whether or not the cell is the second cell where the first cell and the second cell are configured for a carrier aggregation, wherein the second cell is not the neighboring cell, and a frequency of the applicable cell is the same frequency as a frequency of the second cell;

evaluating the condition of the event for the applicable cell; and transmitting a measurement result based on the condition of the event for the applicable cell in a case that the condition is fulfilled.

5. A processing method performed in a base station apparatus, the processing method comprising:

communicating with a mobile station apparatus using a first cell and a second cell;

transmitting measurement control information including first information, second information and third information, wherein the first information indicates an event, the second information indicates parameters for evaluating a condition of the event for comparison of reception quality of an applicable cell with reception quality of the second cell, the third information indicates a list of one or more cell identifications, the list identifying one or more cells not to be considered in evaluating the condition, a neighboring cell is determined as the applicable cell based on the list, whether or not a cell detected on an associated frequency is determined as the neighboring cell is based on whether or not the cell is the second cell, where the first cell and the second cell are configured for a carrier aggregation, the second cell is not the neighboring cell, a frequency of the applicable cell is the same frequency as a frequency of the second cell, and the condition of the event for the applicable cell is evaluated; and receiving a measurement result based on the condition of the event for the applicable cell in a case that the condition is fulfilled.

* * * * *